United States Patent
Sullivan et al.

[11] Patent Number: 5,356,941
[45] Date of Patent: Oct. 18, 1994

[54] GAME BALLS HAVING IMPROVED CORE COMPOSITIONS

[75] Inventors: Michael J. Sullivan, Chicopee, Mass.; Terence Melvin, Somers, Conn.

[73] Assignee: Lisco, Inc., Tampa, Fla.

[21] Appl. No.: 843,565

[22] Filed: Feb. 28, 1992

[51] Int. Cl.⁵ ............................................. C08J 9/00
[52] U.S. Cl. ................................ 521/96; 273/58 R; 273/60 R; 521/54; 521/79
[58] Field of Search ............... 521/79, 54, 96; 273/58, 273/60 R

[56] References Cited

U.S. PATENT DOCUMENTS

| | | | |
|---|---|---|---|
| 4,369,257 | 1/1983 | Hoki et al. | 521/79 |
| 5,026,736 | 6/1991 | Pontiff | 521/60 |
| 5,051,531 | 9/1991 | Sanchez | 560/302 |

*Primary Examiner*—John Kight, III
*Assistant Examiner*—T. Mosley

[57] ABSTRACT

A game ball core comprising a thermoplastic resin or blend of resins, a chemical blowing agent, a nucleating agent, peroxide crosslinking agent and other minor additives is disclosed. The molded cellular core is sufficiently durable to withstand a synthetic cover molding process at elevated temperatures.

25 Claims, 3 Drawing Sheets

GAME BALLS HAVING IMPROVED CORE COMPOSITIONS

BACKGROUND OF THE INVENTION

The present invention is directed to the art of game balls, and more specifically to the art of game ball construction. The invention is particularly directed to the production of softballs and baseballs having improved thermoplastic molded cores, and will be described with particular reference thereto. It will be appreciated, however, that the invention can have usefulness in other fields and applications and may be advantageously employed in other environments.

The present invention relates generally to improved core, or center, compositions for the construction of game balls such as softballs and baseballs. While the invention will be described with specific reference to traditional flight 12 inch two-piece molded softballs, it is understood by those skilled in the art that the invention may also be utilized for the construction of molded softballs and/or game balls of various sizes (i.e. baseballs are generally 9 inches in circumference, while softballs range in size from 10 to 16 inches in circumference). Furthermore, if desired, the core composition may be molded as a one-piece unitary structure, although the two-piece molded ball is preferred.

Traditional flight two-piece molded softballs can be formed according to processes and methods set forth in U.S. Pat. Nos. 4,725,058, 4,729,566 and 4,840,378. These softballs are generally comprised of a molded core and a molded cover. Although the dimensions and the properties of the molded balls differ depending upon league rules, playing characteristics desired, etc., the balls typically have a circumference of approximately 11 inches (i.e. an "11 inch ball") to 12 inches (i.e. a "twelve inch ball") and weigh about 160 to about 200 grams.

Specifically, according to the American Softball Association (A.S.A.) specifications, the weight of finished 11 inch balls ranges from 160–175 grams, and that of finished 12 inch balls ranges from 175–200 grams. The coefficient of restitution (C.O.R.) for traditional flight softballs is 0.500 maximum at 88 fps for both 11 and 12 inch balls. In addition, the compression of the traditional flight balls ranges between 0.007 and 0.014 inches.

The core, or center, of a two-piece molded 12 inch (30.5 cm) softball generally has a density from about 15.5 to 16.5 lbs. per cubic foot, and a hardness from about 72 to 78 on the Shore A scale. The core is typically formed from a cellular polymeric material, and can be comprised of polyurethane foam made up of an isocyanate and a polyol (see U.S. Pat. Nos. 4,725,058 and 4,840,378), or a foamed thermoplastic (e.g., ionomer resins or ethylene vinyl acetate (EVA), see U.S. Pat. No. 4,364,565). While its diameter is typically between about 3.65 and about 3.7 inches, and its weight ranges from about 135 grams to about 150 grams, the size of the core may be adjusted to compensate for the thickness of cover material chosen.

In this regard, the core of a 12 inch two-piece molded softball is generally surrounded by a cover having a specific gravity of about 1.2, a thickness of from about 0.035 to 0.060 inches (more typically between about 0.040 and 0.060 inches) and a hardness of from about 78 to about 90 on the Shore A scale. If a vinyl resin cover is utilized, the cover can be formed from a vinyl resin, a phthalate compound plasticizer, stabilizers and a titanium dioxide dispersion. It is typically molded over the core according to a plastisol (a dispersion of finely divided resin in a plasticizer) fusion process.

As a result of the strong impact and frictional forces normally applied during play to the finished softballs and baseballs, strong adhesive and durability properties are required by the cover and core compositions. Numerous compositions and processes have been developed for the purpose of improving the overall durability and playability characteristics of the balls.

One problem with the molded softballs of the prior art stems from the application of the cover to the core. Quite often, the thermoplastic resin cores do not withstand the cover molding cycle. For example, many of the core compositions of the prior art collapse or distort upon being subjected to the cover molding plastisol fusion process and are thus deficient in durability.

As a result of the deformation which occurs to the core during the process of cover molding, it has become desirable to develop a new core composition. Such a new core composition should have all the desirable playability properties of softballs but should also be made to withstand the collapsing or distortion which is common to cores upon molding of the cover.

In accordance with the present invention, thermoplastic core compositions are produced which are sufficiently durable to withstand the high temperatures and conditions produced during the cover molding cycle. In addition, the resultant game balls produced incorporating the core compositions of the present invention exhibit the durability and playability characteristics necessary for repetitive play.

BRIEF DESCRIPTION OF THE INVENTION

In an effort to achieve a core composition which can withstand the cover molding process, a peroxide crosslinking agent is included in a cellular core composition. Although the necessity of adding the peroxide crosslinking agent increases the expense of producing the core compositions and adds additional critical processing parameters which must be carefully controlled, balls produced utilizing the new core compositions are much more durable than those produced using core compositions known in the art.

More specifically, the core composition of the present invention comprises a thermoplastic resin having polymer radicals, a blowing agent, a nucleating agent, and a peroxide crosslinking agent for forming irreversible covalent bonds between the polymer radicals. The advantage of the present invention is that by the addition of the peroxide crosslinking agent to the core composition, the peroxide, as a free radical source, initiates and assists in forming permanent covalent bonds between the polymer radicals.

In this regard, the peroxide crosslinking which occurs in the present invention involves the formation of polymer radicals via hydrogen abstraction by the peroxy radicals formed from the decomposition of the peroxide. Crosslinking occurs by the coupling of the polymer radicals. These crosslinks are irreversible and permanent as opposed to the ionic, thermally reversible crosslinks produced by the crosslinking agent composed of various heavy metal organic salts described in the prior art, such as Tomar, U.S. Pat. No. 4,364,565.

The permanent and irreversible covalent bonds produced by the present invention aid in making the polymeric core sufficiently durable to withstand the cover molding process at temperatures of about 320° to 350° F. The benefits gained by the addition of the peroxides (i.e. increased heat resistance and more stable cell structure) cannot be obtained by the addition of the thermolabile crosslinking agents described in Tomar. Consequently, it is less likely that a core prepared in accordance with the present invention will deform or distort upon application of the cover thereon.

Moreover, games balls, such as softballs, prepared from the cellular core compositions of the present invention comprise an additional aspect of this invention, as well as the methods for producing the balls described below.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The following is a brief description of the drawings which are presented for the purposes of illustrating the invention and not for purposes of limiting the same.

DETAILED DESCRIPTION OF THE INVENTION

Figure 1:
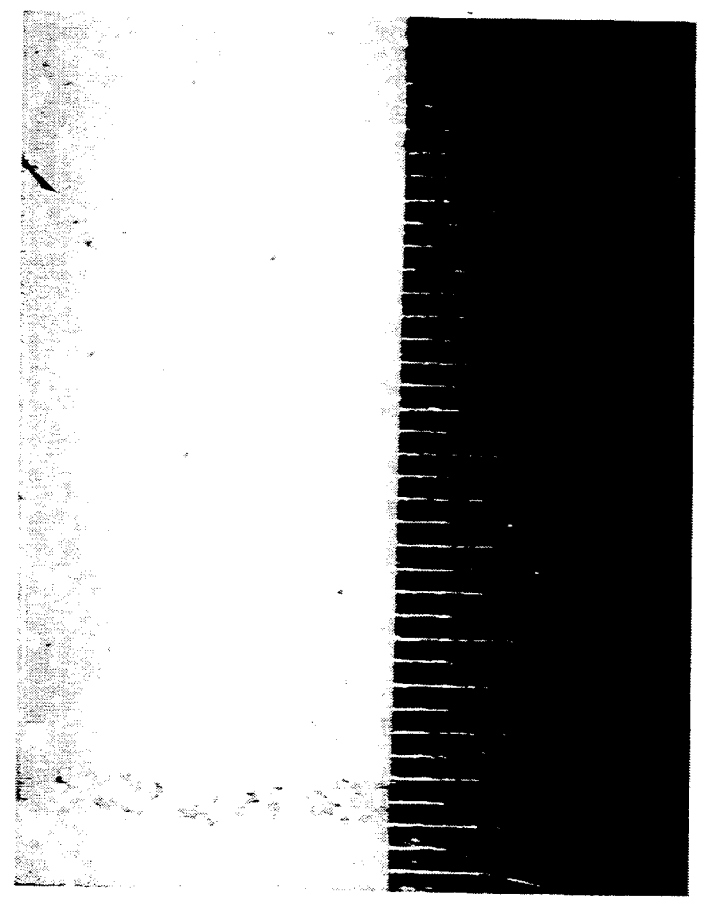
FIG. 1 is a photomicrograph of a cross-sectional view of a cellular softball core of the present invention. Specifically, the photomicrograph is of a cellular softball core produced according to the formulation set forth in Example II below. The scale is in 1/64th of an inch (i.e. 0.0156 of an inch). The magnification is 7.5×.

The present invention relates to improved core compositions for game balls, such as softballs and baseballs, used for both recreational and/or tournament play, as well as the resultant balls produced utilizing the core compositions. The core compositions exhibit enhanced mechanical strength and durability properties while maintaining the desired weight, compression and coefficient of restitution (i.e. C.O.R.) values necessary for competitive play.

The core compositions of the present invention are comprised of a thermoplastic resin (or blend of resins), a chemical blowing agent, a nucleating agent, and a peroxide crosslinking agent. In addition, other minor additives including zinc oxide, stearic acid, zinc stearate, plasticizers and selected co-agents may be included to enhance certain desired characteristics. The peroxide crosslinking agent selected for the present invention plays an important role in forming molded cores that will withstand the cover molding cycle without the cores collapsing and/or being distorted.

The thermoplastic resins that can be used in forming a core in accordance with the present invention include both polymers or copolymers of olefinically unsaturated compounds and their derivatives such as ethylene vinyl acetate (EVA) copolymers, ethylene methyl acrylate (EMA), ethylene ethyl acrylate (EEA), polyethylene, polypropylene, polystyrene, vinyl resins, nylons polycarbonates, thermoplastic polyurethanes, polyhydroxy ethers and the like. Preferably, polymers and copolymers of ethylene and acrylic or methacrylic acid are used.

Moreover, the ethylene copolymer can be ionically crosslinked with additional polymers such as those provided when the acid groups are neutralized with metal cations (i.e. ionomers), or they can simply be random copolymers which are not ionically crosslinked. Consequently, the resins can be either neutralized (ionomeric) or unneutralized (non-ionomeric).

The ionomers which are suitable for use in the invention include thermoplastics that are produced as copolymers of one or more alpha olefins with an unsaturated carboxylic monomer followed by partial neutralization of the carboxylic acid groups of the copolymer with a metal cation. In this regard, the ionic copolymers generally comprises one or more $\alpha$-olefins having from 2 to 8 carbon atoms and from about 9 to about 20 weight percent of $\alpha$, $\beta$-ethylenically unsaturated mono- or dicarboxylic acid having from 3 to 8 carbon atoms, the basic copolymer neutralized (approximately 15–75 percent) with metal ions to the extent desired.

Suitable olefins for use in preparing the ionomeric resins include ethylene, propylene, butene-1, hexene-1, and the like. Unsaturated carboxylic acids include acrylic, methacrylic, ethacrylic, $\alpha$-chloroacrylic, crotonic, maleic, fumaric, iraconic acids, and the like. The metal ions, such as sodium, zinc, magnesium, lithium, potassium, calcium, etc., are used to neutralize some portion of the acid groups in the ionic copolymers. In some instances, an additional softening comonomer such as an acrylic ester can also be included to form a terpolymer. Preferably, the ionomeric resins are copolymers of ethylene and either acrylic and/or methacrylic acid. In addition, two or more types of ionomeric resins may be blended into the compositions in order to produce the desired properties of the core composition. Examples of ionomeric thermoplastic resins which can be used are those marketed under the trademark SURLYN by E.I. DuPont de Nemours & Company, and under the trademark ESCOR or the tradename "Iotek" by the Exxon Corporation.

The ionomeric resins introduced under the designation "Escor ®" and now sold under the new designation "Iotek", are somewhat similar to the ionomeric resins sold under the "Surlyn ®" trademark. However, since the "Iotek" ionomeric resins are cation salts of poly(ethylene acrylic acid) and the "Surlyn ®" resins are cation salts of poly(ethylene methacrylic acid) some differences in properties exist. The physical properties of these various resins are described in technical bulletins which are readily available from DuPont and Exxon.

While a large variety of these ionomer resins are suitable for use in the present invention, the principal ionomer resins which are useful in this invention include Surlyn ® 8528, Surlyn ® 9450, Surlyn ® 9910, Surlyn ® 8940, Surlyn ® 8920. Typical properties of these resins are set forth below:

TABLE 1

Typical Properties of Surlyn ® Resins

| TYPICAL PROPERTIES | ASTM D | 8940 | 9910 | 8920 | 8528 | 9970 | 9730 | 9450 |
|---|---|---|---|---|---|---|---|---|
| Cation Type | | Sodium | Zinc | Sodium | Sodium | Zinc | Zinc | Zinc |
| Melt flow index, gms/10 min. | D-1238 | 2.8 | 0.7 | 0.9 | 1.3 | 14.0 | 1.6 | 5.5 |
| Specific Gravity g/cm$^3$ | D-792 | 0.95 | 0.97 | 0.95 | 0.94 | 0.95 | 0.95 | 0.94 |
| Hardness, Shore D | D-2240 | 66 | 64 | 66 | 60 | 62 | 63 | 54 |
| Tensile Strength, (kpsi) MPa | D-638 | (4.8) 33.1 | (3.6) 24.8 | (5.4) 37.2 | (4.2) 29.0 | (3.2) 22.0 | (4.1) 28.0 | (3.1) 21.4 |
| Elongation, % | D-638 | 470 | 290 | 350 | 450 | 460 | 460 | 500 |
| Flexural Modulus, (kpsi) MPa | D-790 | (51) 350 | (48) 330 | (55) 380 | (32) 220 | (28) 190 | (30) 210 | (19) 130 |
| Tensile Impact (23° C.) KJ/m$_2$ (ft.-lbs./in$^2$) | D-18225 | 1020 (485) | 1020 (485) | 865 (410) | 1160 (550) | 760 (360) | 1240 (590) | 560 (265) |
| Vicat Temperature, °C. | D-1525 | 63 | 62 | 58 | 73 | 61 | 73 | 79 |
| % Weight Methacrylic Acid (MAA) | | 15 | 15 | 15 | 10 | 15 | 12 | 9 |
| % of Acid Groups Cation Neutralized | | 29 | 58 | 59 | 54 | 22 | 38 | 18 |

Similarly, the Iotek ionomers sold by Exxon may also be utilized. These ionomers have the following typical properties:

TABLE 2

Typical Properties of Iotek ® Resins

| CATION TYPE PROPERTIES | ASTM D | SODIUM | | | ZINC | | |
|---|---|---|---|---|---|---|---|
| | | 8000 | 8020 | 8030 | 7010 | 7020 | 7030 |
| Melt index, g/10 min. | D-1238 | 0.8 | 1.6 | 2.8 | 0.8 | 1.5 | 2.5 |
| Density, g/cc | D-1505 | 0.95 | 0.96 | 0.96 | 0.96 | 0.96 | 0.96 |
| Melting Point, °F. | D-3417 | 194 | 189 | 189 | 194 | 194 | 194 |
| Vicat Softening Point °F. | D-1525 | 142 | 147 | 153 | 140 | 147 | 144 |
| Toughness | | | | | | | |
| Tensile Impact @ 40° F., ft-lb/in$^2$ | D-1822 | 1000 | 950 | 760 | 735 | 770 | 665 |
| Tensile Impact @ 73° F., ft-lb/in$^2$ | D-1822 | 645 | 454 | 401 | 460 | 420 | 320 |
| Mechanical | | | | | | | |
| Tensile Strength, psi | D-638 | 5200 | 4600 | 4100 | 3800 | 3800 | 3500 |
| Tensile @ Yield, psi | D-638 | 3100 | 3100 | 3300 | NO YIELD | | |
| Elongation, % | D-638 | 350 | 410 | 395 | 500 | 420 | 395 |
| Flex Resistance (DeMattia), cycles | D-430 | 880 | 1210 | 1090 | >5000 | >5000 | >5000 |
| Flex Modulus, kpsi | D-790 | 50 | 49 | 49 | 26 | 21 | 16 |
| Hardness, Shore D | D-2240 | 61 | 58 | 59 | 57 | 55 | 55 |
| Abrasion Resistance (Volume Loss), mm$^3$ | D-1242 | 17 | 16 | 28 | 14 | 23 | 24 |

Alternatively, unneutralized or non-ionomeric thermoplastic resins can e used in preparing the cores of the present invention. In this regard, an unneutralized thermoplastic copolymer of ethylene and acrylic or methacrylic acid, particularly those in which the units are randomly distributed along the polymer chain, can be used. A suitable material of this type is also available from DuPont under the trade designation NUCREL resin. Examples of such resins are Nucrel ® 403, Nucrel ® 925, Nucrel ® 403, etc., whose properties are indicated below:

TABLE 3

Typical Properties of Nucrel ® Resins

| Typical Properties | ASTM | Grade | | | | | | |
|---|---|---|---|---|---|---|---|---|
| | | 010 | 403 | 410 | 535 | 699 | 714 | 960 |
| Melt Index, dg/min | D1238 | 11 | 3.0 | 10 | 35 | 88 | 14 | 60 |
| Density, g/cm$^3$ | D792 | .934 | .934 | .933 | .934 | .937 | .937 | .941 |
| Tensile Strength, MPa (kpsi) | D638 | 22.1 (3.2) | 24.7 (3.6) | 21.4 (3.1) | 21.4 (3.1) | 15.2 (2.2) | 22.7 (3.3) | 21.4 (3.1) |
| Elongation, % | D638 | 630 | 568 | 600 | 580 | 560 | 560 | 540 |
| Flexural Modulus, MPa (kpsi) 23° C. (73° F.) | D790 | 40.0 (5.8) | 152 (22) | 93.8 (13.6) | 71 (10.3) | 68.3 (9.9) | 66.9 (9.7) | 55.1 (8.0) |
| Hardness, Shore D | D2240 | 40 | 53 | 49 | 48 | 46 | 50 | 46 |
| Vicat Softening Temperature, °C. (°F.) | D1525, Rate B | 64 (147) | 83 (181) | 80 (176) | 75 (167) | 71 (160) | 74 (165) | 62 (144) |
| Notched Izod, J/m (ft-lb/in) | D256 | No Break | No Break | No Break | No Break | No Break | No Break | No Break |
| Tensile Impact, kJ/m$^2$ | D18225 | | | | | | | |
| 23° C. (73° F.) | | 998 (475) | 756 (360) | 872 (415) | 723 (344) | 491 (233) | 812 (386) | 606 (289) |
| −40° C. (−40° F.) | | 647 (308) | 442 (210) | 707 (336) | 486 (231) | 288 (137) | 465 (221) | 342 (163) |
| | | 035 | | 925 | | 599 | | |

TABLE 3-continued

Typical Properties of Nucrel ® Resins

| Typical Properties | | | |
|---|---|---|---|
| Melt Index, dg/min (ASTM D1238) | 35 | 21 | 500 |
| Density, g/cm$^3$ (ASTM D792) | 0.94 | 0.97 | .918 |
| Tensile Strength, MPa (kpsi) (ASTM D638) | 17.9 (2.6) | 25 (3.6) | 10.3 (1.5) |
| Elongation, % (ASTM D638) | 640 | 520 | 530 |
| Flexural Modulus, MPa (kpsi) (ASTM D790) 23° C. (73° F.) | 59 (8.6) | 74 (10.8) | 64.8 (9.4) |
| Hardness, Shore D (ASTM D2240) | 40 | 50 | 42 |
| Vicat Softening Temperature, °C. (°F.) (ASTM D1525, Rate B) | 60 (140) | 67 (153) | 65 (149) |
| Notched Izod, J/m (ft-lb/in) (ASTM D256) | 374 (7) | 801 (15) | No Break |
| Tensile Impact, kJm$^2$ (ft-lb/in$^2$) (ASTM D1822S), 23° C. (73° F.) −40° C. (−40° F.) | 1060 (505) 945 (450) | 755 (360) 275 (130) | 413 (196) 55 (26) |

In addition, PRIMACOR polyethylene acrylic acid copolymers available from Dow Chemical Co. can be used as the thermoplastic resin component of the core composition. Along this line, Primacor ® 1410, Primacor ® 1420, Primacor ® 1430, Primacor ® 3440, Primacor ® 3340, etc., appear to be particularly wall suited for the present invention. These resins may be characterized as follows:

TABLE 4

Typical Properties of Primacor ® Resins

| | ASTM | 1410 | 1420 | 1430 |
|---|---|---|---|---|
| Physical Properties | | | | |
| Melt Index, g/10 min | D-1238 | 1.5 | 3.0 | 5.0 |
| Density, g/cm | D-792 | 0.938 | 0.938 | 0.938 |
| Vicat Softening Point, °F. (°C.) | D-1525 | 180 (82) | 180 (82) | 180 (82) |
| Tensile Yield, psi | D-638 | 1150 | 1125 | 1000 |
| Ultimate Tensile, psi | D-638 | 3400 | 3150 | 3000 |
| Ultimate Elongation, % | D-638 | 625 | 600 | 685 |
| Tensile Modulus, 2% Secant, psi | D-638 | 18,000 | 18,000 | 18,000 |
| FILM PROPERTIES, 2.0 MIL | | | | |
| Dart Impact, g (Method B) | D-1709 | 575 | 475 | 335 |
| Elmendorf Tear Strength, g | | | | |
| Machine Direction | D-1922 | 350 | 380 | 780 |
| Cross Direction | D-1922 | 375 | 500 | 850 |
| Tensile Yield, psi | | | | |
| Machine Direction | D-882 | 1250 | 1150 | 1475 |
| Cross Direction | D-882 | 1150 | 1050 | 1100 |
| Ultimate Tensile, psi | | | | |
| Machine Direction | D-882 | 5800 | 5400 | 5000 |
| Cross Direction | D-882 | 6000 | 5400 | 4800 |
| Ultimate Elongation, % | | | | |
| Machine Direction | D-882 | 550 | 515 | 485 |
| Cross Direction | D-882 | 560 | 510 | 575 |
| Gloss, 45° | D-2457 | 60 | 60 | 80 |
| Haze, % | D-1003 | 6.5 | 6.0 | 5.0 |

| Physical Properties | ASTM | 3340 | 3440 |
|---|---|---|---|
| Melt Index, g/10 min | D-1238 | 9.0 | 10.0 |
| Density, g/cc | D-792 | 0.9320 | 0.940 |
| Tensile Yield, psi | D-638 | 1145 | 1150 |
| Ultimate Tensile, psi | D-638 | 2500 | 2550 |
| Elongation, % | D-638 | 630 | 600 |
| Hardness, Shore D | D-2240 | 50 | 58 |
| Vicat Softening Point, °F. (°C.) | D-1525 | 183 (84) | 175 (80) |

TABLE 4-continued

Typical Properties of Primacor ® Resins

| Low Temperature Brittleness, °F. (°C.) | D-746 | ←105 (−76) | ←105 (−76) |
|---|---|---|---|
| Environmental Stress Crack Resistance, hrs | D-1693 | >100 | >200 |
| WVTR, gm-mil/100 in$^2$, 24 hrs, ATM | 1.0 @ 100° F., 90% R.H. | | |

| Performance Characteristics | Melt Temperature, 550° F. (288° C.) | Melt Temperature 550° F. (288° C.) |
|---|---|---|
| Neck-In, Inches @ 1.0 mil Thickness | 2.0 | 2.0 |
| Minimum Coating Thickness, mil | 0.55 | 0.40 |
| Minimum Coating Weight, lb/3000 sq ft | 8.5 | 6.0 |

Similarly, polyethylene vinyl acetate resins such as the ELVAX series of resins available from DuPont can also be included in the core. These resins typically have a vinyl acetate content of from 10 to 50 percent, and most desirably from about 9 to 40 percent. The additional typical properties of the Elvax ® series of resins are as follows:

TABLE 5

Typical Properties of Elvax ® Resins

| Grade | Melt Index | % Vinyl Acetate | Density @ 23° C. kg/m$^3$ (g/cm$^3$) ASTM D1505 | Tensile Strength MPa (psi) ASTM D1708 | Elongation at Break, % ASTM D1708 |
|---|---|---|---|---|---|
| ELVAX 40-W | 56 | 40.0 | 965 (0.965) | 4.8–6.2 (750–900) | 1000–1300 |
| ELVAX 140-W | 400 | 33.0 | 957 (0.957) | 2.0–2.6 (250–450) | 800–1000 |
| ELVAX 150-W | 43 | 33.0 | 957 (0.957) | 6.9–8.3 (1000–1200) | 900–1100 |
| ELVAX 205-W | 800 | 28.0 | 951 (0.951) | 2.6 (375) | 400–600 |
| ELVAX 210-W | 400 | 28.0 | 951 (0.951) | 2.8 (400) | 800–1000 |
| ELVAX 220-W | 150 | 28.0 | 951 (0.951) | 5.5 (800) | |
| ELVAX | 43 | 28.0 | 951 | 9.7 | |

TABLE 5-continued

Typical Properties of Elvax ® Resins

| Grade | | | | | |
|---|---|---|---|---|---|
| 240-W | | | (0.951) | (1400) | |
| ELVAX 250-W | 25 | 28.0 | 951 (0.951) | 11 (1600) | |
| ELVAX 260 | 6.0 | 28.0 | 955 (0.955) | 24 (3500) | |
| ELVAX 265 | 3.0 | 28.0 | 955 (0.955) | 29 (4200) | |
| ELVAX 310 | 400 | 25.0 | 948 (0.948) | 3.3 (475) | 800–1000 |
| ELVAX 350 | 19 | 25.0 | 948 (0.948) | 14 (2000) | |
| ELVAX 360 | 2.0 | 25.0 | (950) (0.950) | 26 (3800) | |
| ELVAX 410 | 500 | 18.0 | 934 (0.934) | 4.7 (675) | 600–900 |
| ELVAX 420 | 150 | 18.0 | 937 (0.937) | 8.6 (1250) | |
| ELVAX 450 | 8.0 | 18.0 | 940 (0.940) | 18 (2550) | 600–900 |
| ELVAX 460 | 2.5 | 18.0 | 941 (0.941) | 23 (3300) | |
| ELVAX 470 | 0.7 | 18.0 | 940 (0.940) | 26 (3800) | |
| ELVAX 550 | 8.0 | 15.0 | 935 (0.935) | 18 (2600) | 800–900 |
| ELVAX 560 | 2.5 | 15.0 | 40 (0.940) | 22 (3200) | |
| ELVAX 650 | 8.0 | 12.0 | 933 (0.933) | 17 (2500) | 750–850 |
| ELVAX 660 | 2.5 | 12.0 | 940 (0.940) | 21 (3000) | |
| ELVAX 670 | 0.3 | 12.0 | 940 (0.940) | 26 (3800) | |
| ELVAX 750 | 7.0 | 9.0 | 930 (0.930) | 15 (2200) | 600–750 |
| ELVAX 760 | 2.0 | 9.3 | 930 (0.930) | 21 (3000) | |
| ELVAX 770 | 0.8 | 9.5 | 930 (0.930) | 22 (3200) | |

| Grade | Elastic (Tensile) Modulus MPa (psi) ASTM D1708 | Hardness Shore A-2 Durometer, 10 sec ASTM D2240 | Softening Point Ring & Ball, °C. (°F.) ASTM E28 | Cloud Point in Paraffin Wax, °C. (°F.) |
|---|---|---|---|---|
| ELVAX 40-W | 3.0 (450) | 40 | 104 (220) | 154 (310) [20%] |
| ELVAX 140-W | 6.2 (900) | 65 | 74 (165) | 87 (188) |
| ELVAX 150-W | 10.0 (1400) | 65 | 110 (230) | 102 (215) |
| ELVAX 205-W | 12 (1700) | 75 | 80 (176) | 66 (150) |
| ELVAX 210-W | 12 (1700) | 62 | 82 (180) | 66 (150) |
| ELVAX 220-W | 16 (2300) | 69 | 88 (190) | 66 (150) |
| ELVAX 240-W | 18 (2600) | 73 | 110 (230) | 66 (150) |
| ELVAX 250-W | 19 (2800) | 75 | 127 (260) | 66 (150) |
| ELVAX 260 | 26 (3800) | 80 | 154 (310) | 66 (150) |
| ELVAX 265 | 28 (4100) | 83 | 171 (340) | 66 (150) |
| ELVAX 310 | 16 (2300) | 70 | 88 (190) | 66 (150) |
| ELVAX 350 | 25 (3600) | 80 | 132 (270) | 66 (150) |
| ELVAX 360 | 35 (5100) | 85 | 188 (370) | 66 (150) |
| ELVAX 410 | 33 (4800) | 80 | 88 (190) | 66 (150) |
| ELVAX 420 | 42 (6100) | 84 | 99 (210) | 66 (150) |
| ELVAX 450 | 51 (7400) | 90 | 150 (302) | 66 (150) |
| ELVAX 460 | 52 (7500) | 90 | 199 (390) | 66 (150) |
| ELVAX 470 | 63 (9100) | 92 | 223 (434) | 84 (184) |
| ELVAX 550 | 64 (9300) | 93 | 150 (302) | 71 (160) |
| ELVAX 560 | 74 (10700) | 93 | 188 (370) | 71 (160) |
| ELVAX 650 | 85 (12300) | 94 | 150 (302) | 78 (172) |
| ELVAX 660 | 91 (13200) | 94 | 193 (380) | 78 (172) |
| ELVAX 670 | 100 (14500) | 94 | 233 (452) | 79 (174) |
| ELVAX 750 | 110 (16000) | 95 | 153 (307) | 86 (186) |
| ELVAX 760 | 140 (20000) | 96 | 167 (332) | 86 (186) |

TABLE 5-continued

Typical Properties of Elvax ® Resins

| ELVAX 770 | 160 (23200) | 96 | 227 (440) | 84 (183) |
|---|---|---|---|---|

SURLYN, NUCREL, and ELVAX are all trademarks owned by the E.I. DuPont de Nemours Company, Wilmington, Del. Primacor is a trademark of the Dow Chemical Co., Midland, Mich.

As mentioned above, the resin component of the core can comprise a single type of resin or a blend of different resins. The resin content in the composition is about 100 parts of the overall core composition. Preferably, the resins are selected from among the Surlyn ® ionomers, the Nucrel ® or Primacore polyethylene methacrylic (or acrylic) acid copolymers and the Elvax ® polyethylene vinyl acetate. More specifically, the resins may be selected from among Surlyn ® 8528, Elvax ® 420, Nucrel ®403, and Nucrel ®925.

In order to achieve foaming characteristics desired upon processing, blowing agents are included in the core composition. They are present in an amount generally ranging from about 0.25 to about 5 parts per hundred resin, preferably in the range of about 0.25 to about 2. More preferably, the blowing agent is included in the core composition in the range of about 0.25 to about 1 part per hundred parts resin. Naturally, the percentage of blowing agent utilized in accordance with this invention will vary with physical and chemical properties of the composition, the blowing agent, desired core density, injection pressure, holding pressure, etc.

The blowing agent used is a heat decomposable compound, a gas, or a volatile liquid. Of these, the heat decomposable chemical blowing agent is the most desirable.

The preferred blowing agent is azodicarbonamide (AZ) which is marketed under the trademark CELOGEN and manufactured by Uniroyal Chemical. Both Celogen AZ-130 and Celogen OT, as well as other selected blowing agents, have been used in the present formulation. Other types of heat decomposable blowing agents include sulfonyl hydrazides. When the heat decomposable blowing agents decompose (i.e. by thermal decomposition), they yield a gas such as carbon dioxide or nitrogen that is absorbed by the melt. When the pressure is released, the melt expands to form the foam.

When selecting a heat decomposable blowing agent, it is important to consider the temperature at which the agent decomposes. The agent must activate or decompose at approximately the temperature at which the resin melts. In this regard, azodicarbonamide decomposes at temperatures in the range of 285° to 450° F., sulfonyl hydrazides at 240° to 320° F., etc.

If heat decomposable blowing agents are not used, gas or liquid blowing agents can be used (i.e. they are injected into the melt in the injection molding machine). The gases may be selected from among nitrogen, air, carbon dioxide, methylene chloride, propylene, butylene and gaseous fluorocarbons. The gas is then absorbed into the melt and, upon release of pressure, the melt expands into a foam.

The liquid blowing agents include water and liquid fluorocarbon blowing agents. These can also be used to foam the polymer.

A nucleating agent is also included in the core composition. While other nucleating agents can be used, a calcium carbonate nucleating agent is preferably used in the core composition of the present invention. An example of calcium carbonate which can be used is marketed under the trademark ATOMITE, although other types such as VERFLAKE (Vermont Talc Co.) or GAMA-SPERSE (Georgia Marble Co.) will provide similar results. The nucleating agent is present in the range of about 1 to 15 parts per hundred resin, and more preferably in the range of about 1 to 4 parts per hundred resin.

A number of minor additives can be included in the core composition. They include zinc oxide (a blowing agent activator and filler) fatty acids and zinc stearate (a releasing agent and lubricant). The zinc oxide (such as KADDOX 15 available from C. P. Hall or other types of zinc oxide such as PASCO from Pacific Smelting) is present in the range of 0 to about 2 parts per hundred resin. The fatty acids function to improve moldability and processing. Generally, free fatty acids having from about 10 to about 40 carbon atoms, and preferably having from about 15 to about 20 carbon atoms, are used. An example of such a suitable fatty acid is stearic acid, available from Humko Chemical under the designation(s) F-300, F-1000 or F-2000. When included in the core composition, the fatty acid is present in amounts of about 0 to about 2.

In addition, fillers such as HiSil® 233 a fumed silica produced by PPG, Pittsburgh, Pa. and co-agents such as trimethylolpropane triacrylate available from the Sartomer Chemical Co. may also be included in the core composition. The co-agents are useful in both promoting the decomposition of the blowing agent and assisting in the crosslinking of the resin.

Finally, and key component of the core composition is a crosslinking or curing agent which is a source of peroxide free radicals. The peroxide crosslinking agent which is preferred is the DI-CUP 40 KE, dicumyl peroxide (($(C_6H_5C(CH_3)_2O)_2$, 40% active)), a free radical initiator catalyst trademarked and manufactured by Hercules, Inc., Wilmington, Del. Other suitable peroxide crosslinking agents include any number of peroxides available from the Lucidol Chemical Co.

The peroxide crosslinking agent is introduced (i.e. dry blended, etc.) into the composition prior to forming the core melt in an injection molding machine.

AS indicated above, the use of crosslinking agents in softball compositions is known. For example, in Tomar, U.S. Pat. No. 4,364,565, thermolabile crosslinking agents such as inorganic or organic metal compounds (such as metal salts) are included in the composition. However, since these crosslinking agents are thermolabile, they form thermally reversible crosslinks.

The peroxides included in the core composition of the present invention act as free radical sources which initiate the formation of covalent bonds between the polymer chains. Unlike the crosslinking agents disclosed in Tomar, U.S. Pat. No. 4,364,565, the peroxide crosslinking agents are not thermolabile. As a result, the peroxide crosslinking agent increases the heat resistance of the core. By adding peroxide crosslinking agents, the softball cores of the present invention are made to withstand the cover molding cycle without collapsing or distorting.

In this regard, the addition of the peroxide crosslinking agent provides a number of benefits previously unknown in the art of softball core construction. That is, the peroxide promotes crosslinking of the thermoplastic resin during processing in the barrel of the injection molding machine. As such, the melt viscosity of the composition is increased. By increasing the melt viscosity, a more stable, blown cell structure in the core is provided. Moreover, the peroxide crosslinking agent provides a uniform or consistent cell size which is smaller than the core cell sizes of the prior art. Production of such a consistent smaller cell size serves to provide for a more durable core. The benefits provided by the addition of peroxides could not be obtained by using the thermolabile crosslinking agents disclosed in the prior art.

By including a peroxide crosslinking agent in the core composition, the vinyl cover can be molded over the cores at elevated temperatures (320° to 350° F.) without distorting the core. In addition, the peroxide crosslinking involves the formation of polymer radicals via hydrogen abstraction by the peroxy radicals formed from the decomposition of the peroxide. Thus, the peroxide crosslinking agent provides for the formation of covalent bonds which are irreversible and permanent.

Furthermore, it is within the purview of this invention to add to the core compositions compatible materials which do not affect the basic novel characteristics of the composition of this invention. Among such materials are coloring agents, including dyes and pigments, fillers and similar additives. Additives such as antioxidants, antistatic agents, and stabilizers may also be added. The upper limit of the quantity of additives is usually about 5 percent by weight of the product.

In order to produce the core compositions of the present invention, the above components are combined (usually dry mixed) in a high powered mixer and mixed until homogeneous. The temperature of the blended material is below the decomposition temperature of the blowing agent. The homogeneous mixture is subsequently added to an injection molding machine, such as a screw and ram injection molding machine, which melts the mixture and decomposes the blowing agent under pressure and heat to form an injectable thermoplastic resin mixture.

If a gas blowing agent is utilized, the remaining components of the core composition are dry blended and added to the injection molding machine. The gas is than added to the melt prior to injection.

The injection molding machine has a feed temperature of about 100° to 200° F., an extruder barrel temperature of about 250° to 350° F., and a nozzle temperature of about 320° to 390° F. The injection time can range from less than 0.5 sec. to as high as about 12 sec.

After melt processing in the injection molding machine, the melt is injected (fill time is about 0.5 to 7.50 secs.) from the nozzel of the injection molding machine into the cavities of a mold having dimensions similar to the final core (i.e. cavity size ranging from about 3.72 to 3.80 inches, I.D.) wherein the gas produced by the blowing agent causes foaming to occur thereby filling the cavities of the mold. The mold is subsequently cooled to a temperature of 30° to 60° F. for about 0.5 to 5 minutes. The spherical molded resin is then removed, further cooled for about 5 to 15 minutes and desprued.

The resultant molded cores weigh about 130 to 140 grams, have a diameter of about 3.65 to about 3.75 inches, a hardness of from about 70 to 95 on the Shore A scale, a density of about 0.25 to about 0.30 grams per cubic centimeter, and a C.O.R. value of about 0.400 to 0.600. A cross-sectional view of the cores indicates uniform and consistent cell size. In addition, the size of the cells is smaller (i.e. about ≦0,015 inches in diameter)

than the core cell size of the prior art (i.e. about 0.03 to 0.10 inches in diameter).

Figure 2:
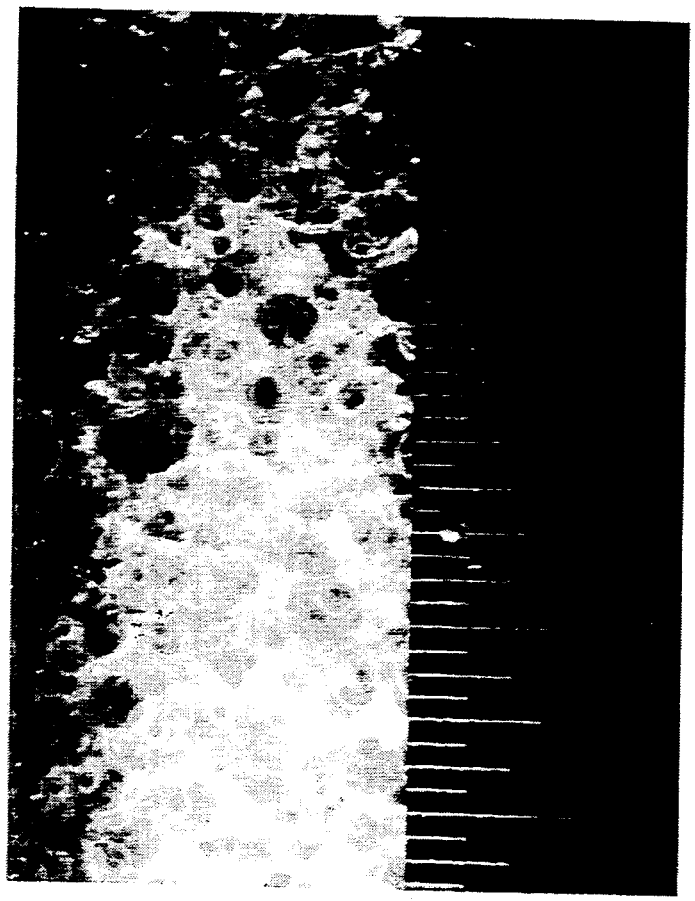
FIG. 2 is a photomicrograph of the cross-sectional view of a cellular softball core produced according to the prior art formulation set forth in Example I below. The scale is in 1/64th of an inch (i.e. 0.0156 of an inch) and the magnification is 7.5×.
Figure 3:
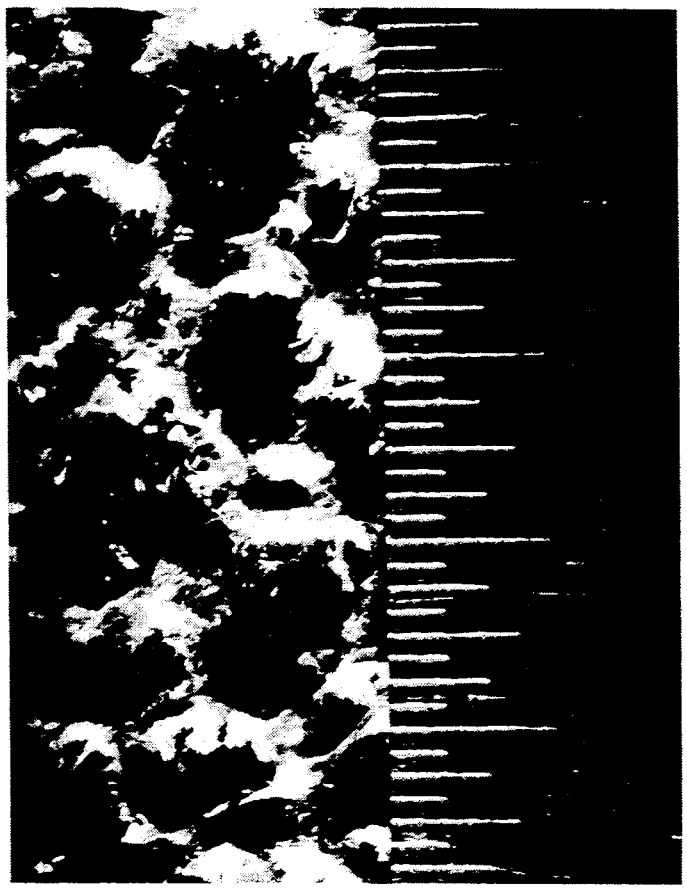
FIG. 3 is a photomicrograph of a cross-sectional view of the prior art "Tomar" cellular softball core. The scale is in 1/64th of an inch (i.e. 0.0156 of an inch). The magnification is 7.5×.

The consistency in cell size and the smaller size of the cells of the present invention over that of the prior art is more clearly exhibited in FIGS. 1–3. In this regard, FIG. 1 is a cross-section view (7.5× magnification) of a cellular softball core of the present invention produced according to the formulation set forth in Example II below. FIG. 2 is a cross-sectional view (7.5×) of a cellular softball core produced according to the prior art. Specifically, the cellular softball core exhibited in FIG. 2 was produced according to the formulation set forth in Example I below. The formulation set forth in Examples I and II are nearly identical except for the incorporation of the peroxide component in Example II. The core composition of FIGS. 1 and 2 were molded under the same conditions.

As indicated in FIGS. 1–2, the inclusion of the peroxide in the present invention (i.e. FIG. 1) produces a dramatic decrease in the average cell size and an increase in cell size consistency when compared to the prior art (i.e. FIG. 2). Along this line, the incorporate of the peroxide component in FIG. 1 reduces the average cell size from about 0.03 inches in FIG. 2 to less than or equal to 0,015 inches in FIG. 1.

In addition, when compared to a cross-sectional view of the cellular core of the Tomar softball (i.e. the softball produced by the Home of Champions, S.A., Port-as-Prince, Haiti) shown in FIG. 3 (7.5×), the cells produced by the present invention (i.e. FIG. 1) are much smaller in size (i.e. ≦0,015 inches in diameter) than the cells of the Tomar cores (i.e. about 0.10 inches in diameter).

Furthermore, the above indicated properties of the present invention can be varied and/or optimized by one skilled in the art by altering the various processing parameters. Along this line, the cores can be altered and formed by varying the temperature of the mold during the initial stages of the injection molding process and by varying other parameters, such as melt temperatures injection time, injection speed, injection pressure, nozzle type, gating, venting, holding pressure, holding time, shot weight, blowing agent concentration, nucleator concentration, polymeric composition, mold surface treatment and mold lubricant.

Once construction has been completed, the cores can be subjected to a number of tests. One such test is the compression test. The compression test is conducted by using a softball compression device, a pre-load weight (574.5 g) and a compression weight (4539 g). A gauge foot is centered directly above the indentation in the based and adjusted to a suitable height to allow ample travel of the gauge stem. The core is then placed on the indentation on the base. Thereafter, the pole axis is positioned under the presser foot. The pre-load weight was placed on the holder and the dial is adjusted to zero. Then, the weight is slipped over the spindle and released as it reaches the pre-load weight. Instantaneous readings are noted when the needle jumps. The test is conducted a number of times, i.e. two each at the poles, the sides and the equation and the results are averaged to obtain a final compression reading.

Durability is measured according to a durability "Pound Test". Along this line, the core is placed in a retainer cup of a softball pound tester. The hammer of the pound tester is positioned at approximately 98 3/4 inches from the ball. The hammer weight is roughly 7 lbs. 8 oz., and travels at a speed of about 20.83 to 20.84 ft/sec. Its radius is about 13/32 inches. The pound tester continues operating to provide up to 185 blows. Fewer blows are made if the ball cracks. The balls are then placed in a cold room for 2 hours prior to post-pound measurements.

In addition, the coefficient of restitution (i.e. liveliness) values can be determined. The processes utilized to determine, the coefficient of restitution is generally measured using a "Jugs" pitching machine (available from JoPaul Industries, Tualatin, Oreg.) with ballistic screens. Specifically, a ball is propelled by two rotating pneumatic tires at a ball speed of 88 ft./sec. against a steel plate positioned 80 ft. from the point where the ball is pinched and subsequently hurled by the rotating tires. The rebound velocity is measured using ballistic screens.

Furthermore, in the preferred embodiments of the invention, a cover is placed over the core composition. As stated above, the cover molding process is typically a plastisol fusion process. While there are many options for molding a leather-like synthetic cover material upon a core, the preferred method is to slush cast and gel a vinyl plastisol cover made from a liquid mixture of a vinyl resin and a plasticizer.

Along this line, the plastisol mixture is coated onto the surface of the cavity of an open mold (cavity size such as to give a cover thickness of 0.040 to 0,070) having a desired cover pattern, such as that disclosed in U.S. Pat. No. 4,729,566. Prior to the coating the mold is heated to about 190° F. to 225° F. to produce a tacky gel. The mold is then opened and the gel separated. A preformed core is inserted onto the separated layer in the mold. The mold is then closed and heated to 350° F. thereby fusing the vinyl layer parts to the core. The fused cover is subsequently cooled to about 150° F. to 175° F. so that the final product can be removed without distortion from the open mold.

Other methods of making the cover include the molding of hemispherical shells that have a thickness of about 0.040 to about 0.070 inches with preferred thickness being about 0.055 inches that are placed around the core; the assembly is then placed into the electroform mold; the mold is closed under low pressure and heated to about 300° to 400° F. to distribute the cover around the core and to accept the texture and definition of the inside of the cavity. The mold is cooled and the finished part removed. Many materials such as vinyl, urethane or other applicable polymers either by themselves or in mixtures or as alloys, may be used as discussed above.

A further method for forming the cover around the core is to inject any of the aforementioned polymers into a closed mold around a previously formed center. Yet another option is to use the RIM (reaction injection molding) technique by injecting the liquid urethane into a mold having a metal core to form the cover. The mold is opened, the metal core is removed, the mold is closed and the center compound is injected into the void to form the center.

A number of the vinyl cover compositions known in the art can be utilized with the core compositions of the present invention in order to produce more durable softballs exhibiting the playing characteristics desired. However, it has been found that the following homopolymer PVC and copolymer PVC/PVAc formulations produce, when utilizing the above described plastisol fusion process, cover compositions exhibit the enhanced tensile strength, viscosity softness and grip characteristics:

| HOMOPOLYMER POLYVINYL CHLORIDE DISPERSION RESIN | |
| --- | --- |
| Component | Parts by Weight |
| Tennaco 1755[1] | 100.0 |
| DINP[2] | 56.8 |
| Vicoflex 4050[3] | 6.5 |
| Mark 797B[4] | 2.0 |
| TiO$_2$ Dispersion | 5.28 |
| (Rutile TiO$_2$[5] - 40) | |
| (DINP - 60) | |
| 100 | |

[1]Tennaco 1775 is a homopolymer polyvinyl chloride dispersion resin.
[2]DINP is diisononyl phthalate plasticizer.
[3]Vicoflex 4050 is an epoxidized soybean oil stabilizer available from Viking Chemical.
[4]Mark 797B is a barium-cadium zinc octoate liquid stabilizer available from Witco.
[5]TiO$_2$ is titanium dioxide, a white pigment.

| COPOLYMER PVC/PVAc DISPERSION RESIN | | |
| --- | --- | --- |
| Component | Parts by Weight | |
| Oxy 0565[6] | 100.0 | |
| DINP | 75.0 | |
| Mark 797B | 1.5 | |
| TiO$_2$ Dispersion | 8.5 | |
| (Titanox 2020 - | 1200) | |
| (DINP - | 1800) | |
| | 3000 | |

[6]Oxy 0565 is a copolymer PVC/PVAc resin, i.e., a mixture of polyvinyl chloride and polyvinyl acetate, available from Occidental Petroleum.

The above indicated homopolymer plastisol has a tensile strength of about 1800 p.s.i. with a Shore A hardness of 75 and a percent elongation of 200%. However, it has been found that the plastisol produced with the Oxy 0565 copolymer of PVC/PVAc has a tensile strength of 1600 p.s.i., a Shore A hardness of 65 and an elongation of 350%, thereby producing a softer "feel" to the softball. In addition, the softer cover allows for the ball to "wrap" around the bat, thus increasing spin and minimizing knuckling. Consequently, the copolymer PVC/PVAc dispersion resin is the more preferred cover composition of the present invention.

The molded covers produced according to the present invention are approximately 0.050 to 0.060 inches in thickness. Naturally when larger cores are utilized the cover thickness can be reduced in order to produce finished softballs fully within the specifications indicated above.

Additional methods for manufacturing two-piece and/or one-piece molded balls are also set forth in the U.S. Pat. Nos. 4,725,058, 4,729,566 and 4,840,378, and are incorporated herein by reference. Although a two-piece molded ball is preferred, it is to be understood that it is within the scope of the invention, to produce balls which comprise a single, spherical mass of core material, and/or a single, spherical mass of core material covered with a separate layer comprised of stitched split leather, top grain leather, stitched synthetics, coated and/or non-coated fabric, etc.

The softballs produced may then be painted and marked, painting being effected by spraying techniques.

When the cover compositions and/or finished coatings are applied to the cores of the present invention, the molded softballs take on a number of characteristics which fall within the American Softball Association (A.S.A.) specifications. Specifically, the weight of the finished 12 inch balls ranges between 175 and 200 grams, the coefficient of restitution (C.O.R.) is approximately 0.500 maximum at 88 fps and the compression ranges between about 0.007 and 0.014.

The present invention is further illustrated by the following examples in which the parts of the specific ingredients are by weight. It is to be understood that the present invention is not limited to the examples, and various changes and modifications may be made in the invention without departing from the spirit and scope thereof.

EXAMPLES

Using the ingredients set forth below, softball cores having a finished diameter of 3.70 inches were produced by injection molding. Each core was formulated using 100 parts thermoplastic resin. In the formulations, the amounts of remaining ingredients are expressed in parts by weight, and the durability and degrees of coefficient of restitution and compression achieved are set forth below. The data for these examples are the averages for 12-24 cores which were produced for each example.

Example I

In the construction of softball cores in accordance with the present invention, 100 parts of Nucrel ® 925, a polyethylene methacrylic acid copolymer, was mixed with about 0.25 parts of Celogen Az-130, a blowing agent supplied by Uniroyal, and 1.0 part calcium carbonate used as a nucleating agent. The resulting mixture was injection molded in a 3.75 inch spherical mold. The resulting product was cooled, removed from the mold, desprued and subjected to a durability test. The following properties were apparent:
Weight: 133 grams
Compression: 0.008-00.009 inches
C.O.R.: 0.400-0.440
Durability (lb. test—number of blows to failure): 105 blows A cross-sectional view of the resulting core structure is set forth in FIG. 2.

Example II

Softball cores were prepared according to Example I, with the exception that 1.0 part of a dicumyl peroxide (40% active) crosslinking agent was added. After the resulting mixture was subjected to injection molding, cooled and desprued, the resultant cores were tested in the same manner as the core in Example I. The following properties were noted:
Weight: 131 grams
Compression: 0.008-0.009 inches 0.425-0.475
Durability (lb. test—number of blows to failure): 155 blows A cross-sectional view of the resulting core structure is set forth in FIG. 1.

As can be seen, the resulting weight, compression and coefficient of restitution values of the cores formed in accordance with Example II remain virtually unchanged from those in Example I. What will be noted, however, is that the addition of the peroxide has caused the resulting cores to have a much greater durability. The cores which lack the peroxide failed after being subjected to 105 blows. The cores of the present example, the ones with the addition of peroxide, show that they were it was able to withstand 155 blows before failure.

In addition, the cellular cores of the present invention exhibit smaller cell size and greater cell size consistency than the cores formed in accordance with Example I. It is believed that the smaller cell size and greater cell size distribution, contributes to the overall durability of the cores of the invention.

Example III

In the construction of additional softball cores in accordance with the present invention, 100 parts of Surlyn ® 8528, a thermoplastic ionomer produced as a copolymer of alpha olefin and a carboxylic monomer (e.g., methacrylic acid), was mixed with about 0.25 parts of CELOGEN AZ-130 azodicarbonamide blowing agent, and about 1.0 part calcium carbonate nucleating agent. The resulting mixture was injection molded. The resulting product was cooled, removed from the mold, and tested. The following properties were apparent:
Weight: 135 grams
Compression: 0.009–0.010 inches
C.O.R.: 0.550–0.610
Durability (lb. test—number of blows to failure): 103 blows

Example IV

Softball cores were prepared according to the formulation set forth in Example III, with the exception that about 1.0 part of a dicumyl peroxide (40% active) crosslinking agent was added. After the resulting mixture was subjected to injection molding and cooled, the resultant cores were tested in the same manner as the cores in Example III. The following properties were noted:
Weight: 133 grams
Compression: 0.009–0.010 inches
C.O.R.: 0.550–0.615
Durability (lb. test—number of blows to failure): 185 blows Here again, the resulting weight, compression and coefficient of restitution values of the cores formed in accordance with Example IV remain virtually unchanged from those in Example III. What will be noted, however, is that the addition of the peroxide has caused the resulting cores to have a much greater durability. The cores which lacked the peroxide failed after being subjected to 103 blows. The cores of the present example, the ones with the addition of peroxide, showed that it withstood all 185 blows without failure. This was the maximum amount of blows applied in the testing process.

Example V

Additional softball cores were prepared in accordance with the formulation set forth in Example IV. The only difference in this example is that Nucrel ® 403 was used in place of the Surlyn ® 8528. The same amount of CELOGEN AZ-130, calcium carbonate, and dicumyl peroxide (40% active) were used. The resulting properties were as follows:
Weight: 136 grams
Compression: 0.007–0.008 inches
C.O.R.: 0.390–0.410
Durability (lb. test—number of blows to failure): 185 blows As in the cases above regarding Examples II and IV, the addition of peroxide crosslinking agent caused the cores to be sufficiently durable to withstand 185 blows.

Example VI

Additional cellular softball cores were formed according to the following wide range of formulations and molding machine parameters. In most cases, a qualitative visual assessment of the core properties was made, i.e. the cores were cut in half, to determine fineness and uniformity of cell size. These trials were produced for the purposes of determining the best set of processing conditions for each particular injection molding machine. Once an undesired processing characteristic was produce, a variable was changed in order to determine the more optical processing characteristics for each machine.

EXAMPLE VI

| Compound | 1 | 2 | 3 | 4 | 5 | 6 | 7 | 8 | 9 | 9a | 10 | 11 | 12 |
|---|---|---|---|---|---|---|---|---|---|---|---|---|---|
| Surlyn 8528 | 100 | 100 | 100 | 50 | 50 | 50 | 100 | 50 | 50 | 50 | | | |
| Elvax 420 | | | | 50 | 50 | 50 | | 50 | 50 | 50 | | | |
| Nucrel 403 | | | | | | | | | | | | | |
| Elvaloy 944 | | | | | | | | | | | | | |
| Nucrel 925 | | | | | | | | | | | 100 | 100 | 100 |
| Celogen AZ-130 | .25 | 5 | .5 | .5 | 1 | 1 | .5 | 1 | .5 | .5 | .5 | .5 | .5 |
| Celogen OT | | | | | | | | | | | | | |
| Hydrocerol BIH | | | | | | | | | | | | | |
| Atomite (CaCO3) | 1 | 15 | 2 | 1 | 2 | 2 | 1 | 4 | 2 | 2 | 2 | 2 | 2 |
| Kaddox 15 (ZnO) | | | | | 1 | 1 | | | | | | 2 | |
| Dicup 40KE: (Dicumyl Peroxide) | | 1 | | | .5 | .5 | | | | | 1 | 1 | 1 |
| Injection Molding Conditions | | | | | | | | | | | | | |
| Machine Type | HPM | | | HPM | | | | | | | HPM | | |
| Machine Size | 14 oz | | | 14 oz | | | | | | | 14 oz | | |
| Injection Time (sec) | 1.5 | | | .7 | | | | | | 12 | .5 | | |
| Low Pressure Hold Time (sec) | 25 | | | 25 | | | | | | | 25 | | |
| Barrel Residence Time (min) | | | | | | | | | | | 0 | 0 | 0 |
| Mid-Zone Residence Time (min) | | | | | | | | | | | | | |
| Front Zone Residence Time (min) | | | | | | | | | | | | | |
| Screw Back Time (sec) | 7 | | | 7 | | | | | | | 8.5 | | |
| Mold Close Time (min) | 3 | 4 | 4 | 3 | | | | | | | 3 | | |
| Screw Speed (rpm) | 55 | | | 57 | | | | | | | 32 | | 36 |

-continued

| | | | | | | | | | | | | |
|---|---|---|---|---|---|---|---|---|---|---|---|---|
| Zone #3 Temp (°F.) | | | | | | | | | | 290 | 290 | 290 |
| Zone #2 Temp (°F.) | | | | | | | | | | 300 | 300 | 300 |
| Zone #1 Temp (°F.) | | | | | | | | | | 310 | 310 | 320 |
| Nozzle Temp (°F.) | | | | | | | | | | 360 | 360 | 390 |
| Melt Temp (°F.) | | 335 | | 360 | 360 | 360 | 380 | 380 | 360 | 360 | 365 | 365 | 375 |
| Mold Temp (°F.) | 30 | | | 30 | | | | | | | 30 | | |
| Part Wt. (gms) | 130 | 139 | 136 | 213 | 219 | 182 | 135 | 150 | 154 | 169 | 0 | 0 | 0 |
| | | | | 210 | 177 | 163 | 145 | 182 | | | | | |
| Part Cooled (Air, Water, Ice) | wat | wat | wat | wat | wat | wat | wat | wat | wat | wat | | | |

| Compound | 13 | 14 | 15 | 15a | 15b | 15c | 15d | 15e | 15f | 15g | 15h | 15i | 15j |
|---|---|---|---|---|---|---|---|---|---|---|---|---|---|
| Surlyn 8528 | | | | | | | | | | | | | |
| Elvax 420 | | | | | | | | | | | | | |
| Nucrel 403 | | | | | | | | | | | | | |
| Elvaloy 944 | | | | | | | | | | | | | |
| Nucrel 925 | 100 | 100 | 100 | 100 | 100 | 100 | 100 | 100 | 100 | 100 | 100 | 100 | 100 |
| Celogen AZ-130 | .5 | .5 | .5 | .5 | .5 | .5 | .5 | .5 | .5 | .5 | .5 | .5 | .5 |
| Celogen OT | | | | | | | | | | | | | |
| Hydrocerol BIH | | | | | | | | | | | | | |
| Atomite (CaCO3) | 2 | 2 | 2 | 2 | 2 | 2 | 2 | 2 | 2 | 2 | 2 | 2 | 2 |
| Kaddox 15 (ZnO) | | | | | | | | | | | | | |
| Dicup 40KE: (Dicumyl Peroxide) | 1 | 1 | 1 | 1 | 1 | 1 | 1 | 1 | 1 | 1 | 1 | 1 | 1 |
| Injection Molding Conditions | | | | | | | | | | | | | |
| Machine Type | HPM | | | | | | | | | | | | |
| Machine Size | 14 oz | | | | | | | | | | | | |
| Injection Time (sec) | .5 | | | | | | | | | | | | |
| Low Pressure Hold Time (sec) | 25 | | | | | | | | | | | | |
| Barrel Residence Time (min) | 0 | 2 | 2 | 3 | 3.5 | 3.5 | 6 | 6.5 | 7 | 7.5 | 7.5 | 7.5 | 7.5 |
| Mid-Zone Residence Time (min) | | | | | 0 | 3 | 3.5 | 3.5 | 4 | 4 | 4 | 4 |
| Front Zone Residence Time (min) | | | | | 3.5 | 3 | 3 | 3.5 | 3.5 | 3.5 | 3.5 | 3.5 |
| Screw Back Time (sec) | 8.5 | | | | | | | | | | | | |
| Mold Close Time (min) | 3 | | | | | | | | | | | | |
| Screw Speed (rpm) | 32 | | | | | | | | | | | | |
| Zone #3 Temp (°F.) | 310 | 310 | 310 | 310 | 310 | | | | | | | | |
| Zone #2 Temp (°F.) | 320 | 320 | 320 | 320 | 320 | | | | | | | | |
| Zone #1 Temp (°F.) | 330 | 340 | 330 | 330 | 330 | | | | | | | | |
| Nozzle Temp (°F.) | 350 | 340 | 330 | 330 | 330 | | | | | | | | |
| Melt Temp (°F.) | 375 | 385 | 360 | 390 | 390 | | | | | | | | |
| Mold Temp (°F.) | | | | | | | | | | | | | >30 |
| Part Wt. (gms) | 0 | 0 | 0 | 155 | 156 | 134 | 136 | 133 | 134 | 134 | 134 | 133 | 134 |
| Part Cooled (Air, Water, Ice) | | | | wat | air | scrap | scrap | scrap | wat | wat | wat | air | air |

| Compound | 15k | 15l | 15m | 15n | 16 | 16a | 16b | 16c | 16d | 16e | 16f | 17a | 17b |
|---|---|---|---|---|---|---|---|---|---|---|---|---|---|
| Surlyn 8528 | | | | | | | | | | | | | |
| Elvax 420 | | | | | | | | | | | | | |
| Nucrel 403 | | | | | | | | | | | | 100 | 100 |
| Elvaloy 944 | | | | | | | | | | | | | |
| Nucrel 925 | 100 | 100 | 100 | 100 | 100 | 100 | 100 | 100 | 100 | 100 | 100 | | |
| Celogen AZ-130 | .5 | .5 | .5 | .5 | .5 | .5 | .5 | .5 | .5 | .5 | .5 | .5 | .5 |
| Celogen OT | | | | | | | | | | | | | |
| Hydrocerol BIH | | | | | | | | | | | | | |
| Atomite (CaCO3) | 2 | 2 | 2 | 2 | 2 | 2 | 2 | 2 | 2 | 2 | 2 | 2 | 2 |
| Kaddox 15 (ZnO) | | | | | 2 | 2 | 2 | 2 | 2 | 2 | 2 | | |
| Dicup 40KE: (Dicumyl Peroxide) | 1 | 1 | 1 | 1 | 1 | 1 | 1 | 1 | 1 | 1 | 1 | 1 | 1 |
| Injection Molding Conditions | | | | | | | | | | | | | |
| Machine Type | | | | | | HPM | | | | | | HPM | |
| Machine Size | | | | | | 14 oz | | | | | | 14 oz | |
| Injection Time (sec) | | | | | | .5 | | | | | | <.5 | |
| Low Pressure Hold Time (sec) | | | | | | 25 | | | | | | 25 | |
| Barrel Residence Time (min) | 7.5 | 7.5 | 7.5 | 7.5 | 3 | 4 | | 4 | 4 | 3 | 4 | 3.75 | 4.5 |
| Mid-Zone Residence Time (min) | 4 | 4 | 4 | 4 | | | | 3 | 3 | 2 | 1 | | |
| Front Zone Residence Time (min) | 3.5 | 3.5 | 3.5 | 3.5 | | | | 1 | 1 | 1 | 3 | | |
| Screw Back Time | | | | | | 8.5 | | | | | | 8.5 | |

-continued

| (sec) | | | | | | | | | | | | |
|---|---|---|---|---|---|---|---|---|---|---|---|---|
| Mold Close Time (min) | | | | | 5 | 3 | 4 | | | h | 3 | |
| Screw Speed (rpm) | | | | | | 32 | | | | o | 36 | |
| Zone #3 Temp (°F.) | | | | 310 | | 310 | 320 | | | r | 310 | |
| Zone #2 Temp (°F.) | | | | 320 | | 320 | 320 | | | | 320 | |
| Zone #1 Temp (°F.) | | | | 330 | | 330 | 330 | | | t | 330 | |
| Nozzle Temp (°F.) | | | | 330 | | 330 | 330 | | | s | 330 | |
| Melt Temp (°F.) | | | 375 | 355 | 400 | 400 | 410 | 400 | 400 | h | 400 | 415 |
| Mold Temp (°F.) | >30 | 53 | 56 | 56 | 30 | | 30 | | | o | 75 | |
| Part Wt. (gms) | 135 | 134 | 135 | 134 | 0 | 137 | 0 | 135 | 130 | 132 | 89 | no foam | no foam |
| Part Cooled (Air, Water, Ice) | air | wat | wat | air | | air | | | air | air | scrap | | |

| Compound | 17c | 17d | 18a | 18b | 18c | 18d | 18e | 18f | 19a | 19b | 19c | 19d | 19e |
|---|---|---|---|---|---|---|---|---|---|---|---|---|---|
| Surlyn 8528 | | | | | | | | | | | | | |
| Elvax 420 | | | | | | | | | | | | | |
| Nucrel 403 | 100 | 100 | 100 | 100 | 100 | 100 | 100 | 100 | 75 | 75 | 75 | 75 | 75 |
| Elvaloy 944 | | | | | | | | | 25 | 25 | 25 | 25 | 25 |
| Nucrel 925 | | | 100 | 100 | 100 | 100 | 100 | 100 | | | | | |
| Celogen AZ-130 | .5 | .5 | .5 | .5 | .5 | .5 | .5 | .5 | .5 | .5 | .5 | .5 | .5 |
| Celogen OT | | | | | | | | | | | | | |
| Hydrocerol BIH | | | | | | | | | | | | | |
| Atomite (CaCO3) | 2 | 2 | 2 | 2 | 2 | 2 | 2 | 2 | 2 | 2 | 2 | 2 | 2 |
| Kaddox 15 (ZnO) | | | | | | | | | 2 | 2 | 2 | 2 | 2 |
| Dicup 40KE: (Dicumyl Peroxide) Injection | 1 | 1 | | | | | | | 1 | 1 | 1 | 1 | 1 |
| Molding Conditions | | | | | | | | | | | | | |
| Machine Type | | | | | | | | | HPM | | | | |
| Machine Size | | | | | | | | | 14 oz | | | | |
| Injection Time (sec) | | | | | | | | | <.5 | | | | |
| Low Pressure Hold Time (sec) | | | | | | | | | 25 | | | | |
| Barrel Residence Time (min) | 5.5 | 6 | 3.5 | 4 | 5 | 7.5 | 8 | 13 | 2 | 5 | 4.5 | 1 | 3 |
| Mid-Zone Residence Time (min) | | | | | | | | 8 | | 2 | 3 | 0 | 0 |
| Front Zone Residence Time (min) | | | | | | | | 5 | | 3 | 1.5 | 1 | 3 |
| Screw Back Time (sec) | | | | | | | | | | 8 | | | |
| Mold Close Time (min) | 3.5 | | | | | | | 4 | | 3 | 1 | 3.5 | |
| Screw Speed (rpm) | | | | | | | | | | 36 | | | |
| Zone #3 Temp (°F.) | | | 310 | | | | | 310 | 310 | 310 | | | |
| Zone #2 Temp (°F.) | | | 320 | | | | | 320 | 320 | 320 | | | |
| Zone #1 Temp (°F.) | | | 330 | | | | | 350 | 350 | 350 | | | |
| Nozzle Temp (°F.) | | | 330 | | | | | 350 | 350 | 350 | | | |
| Melt Temp (°F.) | 425 | 435 | 375 | 400 | 401 | 401 | | 407 | 387 | 425 | | | 375 |
| Mold Temp (°F.) | | | 75 | | | | | | | 75 | | | |
| Part Wt. (gms) | didnt fill mold | tx-link before | not much | not much foam | not much foam | some foam | 151 | didnt fill mold | not much foam | some foam | didnt fill mold | 130 | |
| Part Cooled (Air, Water, Ice) | mold | | | | | | wat | | | | | wat | |

| Compound | 19f | 19g | 19h | 19i | 7a | 7b | 7c | 7d | 7e | 20a | 20b | 20c | 20d |
|---|---|---|---|---|---|---|---|---|---|---|---|---|---|
| Surlyn 8528 | | | | | 100 | 100 | 100 | 100 | 100 | 100 | 100 | 100 | 100 |
| Elvax 420 | | | | | | | | | | | | | |
| Nucrel 403 | 75 | 75 | 75 | 75 | | | | | | | | | |
| Elvaloy 944 | 25 | 25 | 25 | 25 | | | | | | | | | |
| Nucrel 925 | | | | | | | | | | | | | |
| Celogen AZ-130 | .5 | .5 | .5 | .5 | .5 | .5 | .5 | .5 | .5 | .5 | .5 | .5 | .5 |
| Celogen OT | | | | | | | | | | | | | |
| Hydrocerol BIH | | | | | | | | | | | | | |
| Atomite (CaCO3) | 2 | 2 | 2 | 2 | 2 | 2 | 2 | 2 | 2 | 2 | 2 | 2 | 2 |
| Kaddox 15 (ZnO) | 2 | 2 | 2 | 2 | 1 | 1 | 1 | 1 | 1 | .5 | .5 | .5 | .5 |
| Dicup 40KE: (Dicumyl Peroxide) Injection | 1 | 1 | 1 | 1 | .5 | .5 | .5 | .5 | .5 | .25 | .25 | .25 | .25 |
| Molding Conditions | | | | | | | | | | | | | |
| Machine Type | | | | | | | | | | | | | HPM |
| Machine Size | | | | | | | | | | | | | 14 oz |
| Injection Time (sec) | | | | s | | | | | | 2.5 | | | <.5 |
| Low Pressure Hold Time (sec) | | | | h | | | | | | | | | 25 |
| Barrel Residence | 5 | 4 | 4.5 | o | .5 | .5 | .5 | 1 | 1.5 | 1 | 3 | 3.5 | 5.5 |

-continued

| Time (min) | | | | | | | | | | | | | |
|---|---|---|---|---|---|---|---|---|---|---|---|---|---|
| Mid-Zone Residence Time (min) | 3 | 2 | 2 | r | 0 | 0 | 0 | 0 | 0 | 0 | 2.5 | 3 | 3 |
| Front Zone Residence Time (min) | 2 | 2 | 2.5 | t | .5 | .5 | .5 | 1 | 1.5 | 1 | .5 | .5 | .5 |
| Screw Back Time (sec) | | | | | | | | 8 | | | | | 8 |
| Mold Close Time (min) | 2 | 2.5 | 3 | s | 4 | 1.5 | 2 | 2 | 2 | 2 | 2.5 | 2 | 2 |
| Screw Speed (rpm) (rpm) | | | | h | | | | | | | | | 36 |
| Zone #3 Temp (°F.) | | | | o | 310 | | | | | 310 | | | 310 |
| Zone #2 Temp (°F.) | | | | t | 320 | | | | | 320 | | | 320 |
| Zone #1 Temp (°F.) | | | | | 340 | | | | | 325 | | | 325 |
| Nozzle Temp (°F.) | | | | | 340 | | | | | 325 | | | 325 |
| Melt Temp (°F.) | | | | | 405 | | | | | 405 | 415 | | |
| Mold Temp (°F.) | | | | | 30-50 | | | | | ~45 | | | ~45 |
| Part Wt. (gms) | 131 | not much | x-link before foamed | | 126 | short shot | short shot | short shot | short shot | 122 | 125 | 117 | 105 |
| Part Cooled (Air, Water, Ice) | wat | | | | wat | | | | | wat | wat | wat | wat |

| Compound | 20e | 20f | 20g | 20h | 20i | 20j | 20k | 20l | 20m | 20n | 20o | 20p | 20q |
|---|---|---|---|---|---|---|---|---|---|---|---|---|---|
| Surlyn 8528 | 100 | 100 | 100 | 100 | 100 | 100 | 100 | 100 | 100 | 100 | 100 | 100 | 100 |
| Elvax 420 | | | | | | | | | | | | | |
| Nucrel 403 | | | | | | | | | | | | | |
| Elvaloy 944 | | | | | | | | | | | | | |
| Nucrel 925 | | | | | | | | | | | | | |
| Celogen AZ-130 | .5 | .5 | .5 | .5 | .5 | .5 | .5 | .5 | .5 | .5 | .5 | .5 | .5 |
| Celogen OT | | | | | | | | | | | | | |
| Hydrocerol BIH | | | | | | | | | | | | | |
| Atomite (CaCO3) | 2 | 2 | 2 | 2 | 2 | 2 | 2 | 2 | 2 | 2 | 2 | 2 | 2 |
| Kaddox 15 (ZnO) | .5 | .5 | .5 | .5 | .5 | .5 | .5 | .5 | .5 | .5 | .5 | .5 | .5 |
| Dicup 40KE: (Dicumyl Peroxide) Injection | .25 | .25 | .25 | .25 | .25 | .25 | .25 | .25 | .25 | .25 | .25 | .25 | .25 |
| Molding Conditions | | | | | | | | | | | | | |
| Machine Type | | | | | | | | | | | | | |
| Machine Size | | | | | | | | | | | | | |
| Injection Time (sec) | | | | | | | | | | | | | |
| Low Pressure Hold Time (sec) | | | | | | | | | | | | | |
| Barrel Residence Time (min) | 5.5 | 1 | 4 | 3 | 3 | 3 | | | | | 1 | 4 | 4 |
| Mid-Zone Residence Time (min) | 3 | .5 | 3 | 1.5 | 1.5 | 1.5 | | | | | 0 | 2 | 2 |
| Front Zone Residence Time (min) | .5 | .5 | 1 | 1.5 | 1.5 | 1.5 | | | | | 1 | 2 | 2 |
| Screw Back Time (sec) | | | | | | | | | | | | | |
| Mold Close Time (min) | | | | | | | | | | | | | |
| Screw Speed (rpm) | | | | | | | | | | | | | |
| Zone #3 Temp (°F.) | | | | | | | | | | | | | |
| Zone #2 Temp (°F.) | | | | | | | | | | | | | |
| Zone #1 Temp (°F.) | | | | | | | | | | | | | |
| Nozzle Temp (°F.) | | | | | | | | | | | | | |
| Melt Temp (°F.) | | | | | | | | | | | | | |
| Mold Temp (°F.) | | | | | | | | | | | | | |
| Part Wt. (gms) | 116 | 122 | 122 | 122 | 125 | 133 | | 137 | 145 | | short shot | 130 | 130 |
| Part Cooled (Air, Water, Ice) | wat | wat | wat | wat | air | wat | | wat | wat | | | wat | wat |

| Compound | 20r | 20s | 20t | 20u | 20v | 20w | 20x | 20y | 25a | 25b | 25c | 26a | 26b |
|---|---|---|---|---|---|---|---|---|---|---|---|---|---|
| Surlyn 8528 | 100 | 100 | 100 | 100 | 100 | 100 | 100 | 100 | 100 | 100 | 100 | 100 | 100 |
| Elvax 420 | | | | | | | | | | | | | |
| Nucrel 403 | | | | | | | | | | | | | |
| Elvaloy 944 | | | | | | | | | | | | | |
| Nucrel 925 | | | | | | | | | | | | | |
| Celogen AZ-130 | .5 | .5 | .5 | .5 | .5 | .5 | .5 | .5 | .5 | .5 | .5 | .5 | .5 |
| Celogen OT | | | | | | | | | | | | | |
| Hydrocerol BIH | | | | | | | | | | | | | |
| Atomite (CaCO3) | 2 | 2 | 2 | 2 | 2 | 2 | 2 | 2 | 1 | 1 | 1 | 1 | 1 |
| Kaddox 15 (ZnO) | .5 | .5 | .5 | .5 | .5 | .5 | .5 | .5 | 1 | 1 | 1 | 1 | 1 |
| Dicup 40KE: (Dicumyl Peroxide) Injection | .25 | .25 | .25 | .25 | .25 | .25 | .25 | .25 | .5 | .5 | .5 | .5 | .5 |

-continued

| Molding Conditions | | | | | | | | |
|---|---|---|---|---|---|---|---|---|
| Machine Type | | HPM | | | | | | Stokes |
| Machine Size | | 14 oz | | | | | | 7 oz |
| Injection Time (sec) | | <.5 | | | | | | 2.5 |
| Low Pressure Hold Time (sec) | | 25 | | | | | | |
| Barrel Residence Time (min) | 4 | 4.5 | 4.5 | 5 | 5.5 | 4.5 | 3.5 | 4 |
| Mid-Zone Residence Time (min) | 2 | 2 | 2 | 2.5 | 2.5 | 3 | 1.5 | 2 |
| Front Zone Residence Time (min) | 2 | 2.5 | 2.5 | 2.5 | 3 | 1.5 | 2 | 2 |
| Screw Back Time (sec) | | | 8 | | | | | 20 |
| Mold Close Time (min) | | | | | | | | 2 |
| Screw Speed (rpm) | | | 36 | | | | | 50–75 |
| Zone #3 Temp (°F.) | | | 310 | | | | | 310 |
| Zone #2 Temp (°F.) | | | 320 | | | | | 320 |
| Zone #1 Temp (°F.) | | | 325 | | | | | 330 |
| Nozzle Temp (°F.) | | | 325 | | | | | 330 |
| Melt Temp (°F.) | | | | | | | | 386 |
| Mold Temp (°F.) | | | ~45 | | | | | 45 |
| Part Wt. (gms) | 123 | 122 | 119 | 119 | 115 tore apart | 115 | 117 shot | 147 |
| Part Cooled (Air, Water, Ice) | wat | wat | wat | wat | wat | | wat | |

(additional columns continuing from above row for Injection Time: 4.2, 5; Zone #3: 310; Zone #2: 310; Zone #1: 320; Nozzle: 320; Melt: 360, 360; Mold: 48; Part Wt.: 145, 127.4, 146 blew apart, 147; Part Cooled: air)

| Compound | 26c | 26d | 27a | 27b | 27c | 28a | 28b | 28c | 28d | 28e | 28f | 28g | 28h |
|---|---|---|---|---|---|---|---|---|---|---|---|---|---|
| Surlyn 8528 | 100 | 100 | 100 | 100 | 100 | 100 | 100 | 100 | 100 | 100 | 100 | 100 | 100 |
| Elvax 420 | | | | | | | | | | | | | |
| Nucrel 403 | | | | | | | | | | | | | |
| Elvaloy 944 | | | | | | | | | | | | | |
| Nucrel 925 | | | | | | | | | | | | | |
| Celogen AZ-130 | .5 | .5 | | | | | | | | | | | |
| Celogen OT | | | .5 | .5 | .5 | 2 | 2 | 2 | 2 | 2 | 2 | 2 | 2 |
| Hydrocerol BIH | | | | | | | | | | | | | |
| Atomite (CaCO3) | 1 | 1 | 4 | 4 | 4 | 4 | 4 | 4 | 4 | 4 | 4 | 4 | 4 |
| Kaddox 15 (ZnO) | 1 | 1 | | | | 1 | 1 | 1 | 1 | 1 | 1 | 1 | |
| Dicup 40KE: (Dicumyl Peroxide) Injection | .5 | .5 | .5 | .5 | .5 | .5 | .5 | .5 | .5 | .5 | .5 | .5 | .5 |
| Molding Conditions | | | | | | | | | | | | | |
| Machine Type | | | | | | | | | | | | | Stokes |
| Machine Size | | | | | | | | | | | | | 7 oz |
| Injection Time (sec) | | | 7 | 2.5 | 2.5 | 1.3 | | | | | | | 1.3 |
| Low Pressure Hold Time (sec) | | | | | | | | | | | | | |
| Front Zone Residence Time (min) | | | | | | 0 | 0 | 2 | 2 | | 2 | 2 | 2 |
| Screw Back Time (sec) | | | 35 | | | 43 | | | | | | | 43 |
| Mold Close Time (min) | | | | | | | | | | | | | |
| Screw Speed (rpm) | | | | | | | | | | | | | 50–75 |
| Zone #3 Temp (°F.) | | | 310 | | | | | | | | | | 310 |
| Zone #2 Temp (°F.) | | | 310 | | | | | | | | | | 310 |
| Zone #1 Temp (°F.) | | | 315 | | | | | | | | | | 315 |
| Nozzle Temp (°F.) | | | 315 | | | | | | | | | | 315 |
| Melt Temp (°F.) | 355 | 345 | 357 | | 375 | | | | | | | | |
| Mold Temp (°F.) | | | | | | | | | | | | | 48 |
| Part Wt. (gms) | 133 | | 135 | | | 133 | 133.2 | 136.2 | 135.6 | 135.8 | 135.9 | 135.9 | |
| Part Cooled (Air, Water, Ice) | air | air | | | ice | ice | ice | ice | ice | air | air | air | ice |

| Compound | 28i | 28j | 29a | 29b | 29c | 29d | 29e | 29f | 29g | 29h | 29i | 29j | 29k |
|---|---|---|---|---|---|---|---|---|---|---|---|---|---|
| Surlyn 8528 | 100 | 100 | 100 | 100 | 100 | 100 | 100 | 100 | 100 | 100 | 100 | 100 | 100 |
| Elvax 420 | | | | | | | | | | | | | |
| Nucrel 403 | | | | | | | | | | | | | |
| Elvaloy 944 | | | | | | | | | | | | | |
| Nucrel 925 | | | | | | | | | | | | | |
| Celogen AZ-130 | | | | | | | | | | | | | |
| Celogen OT | 2 | 2 | 2 | 2 | 2 | 2 | 2 | 2 | 2 | 2 | 2 | 2 | 2 |
| Hydrocerol BIH | | | | | | | | | | | | | |
| Atomite (CaCO3) | 4 | 4 | 4 | 4 | 4 | 4 | 4 | 4 | 4 | 4 | 4 | 4 | 4 |
| Kaddox 15 (ZnO) | | | 2 | 2 | 2 | 2 | 2 | 2 | 2 | 2 | 2 | 2 | 2 |
| Dicup 40KE: (Dicumyl Peroxide) Injection | .5 | .5 | .5 | .5 | .5 | .5 | .5 | .5 | .5 | .5 | .5 | .5 | .5 |
| Molding Conditions | | | | | | | | | | | | | |
| Machine Type | | | | | | | | | | | | | |

-continued

| | | | | | | | | | | | | | |
|---|---|---|---|---|---|---|---|---|---|---|---|---|---|
| Machine Size | | | | | | | | | | | | | |
| Injection Time (sec) | 1.5 | 1.3 | 1.5 | | | | | | | | | | |
| Low Pressure Hold Time (sec) | | | | | | | | | | | | | |
| Front Zone Residence Time (min) | 2 | 2 | 0 | 2 | 2 | 2 | 2.5 | 2.5 | 2.5 | 2.5 | 2.5 | 2.5 | 2.5 |
| Cycle Time (min) | | | | | 2 | 2.5 | | | | | 2.5 | 2.5 | |
| Screw Back Time (sec) | 30 | | 43 | | | | | | 43 | 30 | | | |
| Mold Close Time (min) | | | | | | | | | | | | | |
| Screw Speed (rpm) | | | | | | | | | 50–75 | | | | |
| Zone #3 Temp (°F.) | | | | | | | | | 310 | | | | |
| Zone #2 Temp (°F.) | | | | | | | | | 310 | | | | |
| Zone #1 Temp (°F.) | | | | | | | | | 315 | | | | |
| Nozzle Temp (°F.) | | | | | | | | | 315 | | | | |
| Melt Temp (°F.) | | | | | | | | | | | | | |
| Mold Temp (°F.) | | 355 | 375 | | | | | | | | | | |
| Part Wt. (gms) | 135.8 | 135.8 | 137 | 138.1 blew apart | 137.7 blew apart | 137.6 | 134.2 | 134 | 133.7 | 133.5 | 133.3 | 133.4 | 133.4 |
| Part Cooled (Air, Water, Ice) | ice | ice | ice | | | ice | ice | air | air | ice | ice ran smooth | ice ran smooth | air |

| Compound | 30a | 30b | 30c | 30d | 30e | 31a | 31b | 31c | 31d | 31e | 31f | 31g | 31h |
|---|---|---|---|---|---|---|---|---|---|---|---|---|---|
| Surlyn 8528 | 100 | 100 | 100 | 100 | 100 | 100 | 100 | 100 | 100 | 100 | 100 | 100 | 100 |
| Elvax 420 | | | | | | | | | | | | | |
| Nucrel 403 | | | | | | | | | | | | | |
| Elvaloy 944 | | | | | | | | | | | | | |
| Nucrel 925 | | | | | | | | | | | | | |
| Celogen AZ-130 | | | | | | | | | | | | | |
| Celogen OT | 2 | 2 | 2 | 2 | 2 | 2 | 2 | 2 | 2 | 2 | 2 | 2 | 2 |
| Hydrocerol BIH | | | | | | | | | | | | | |
| Atomite (CaCO3) | 4 | 4 | 4 | 4 | 4 | 4 | 4 | 4 | 4 | 4 | 4 | 4 | 4 |
| Kaddox 15 (ZnO) | | | | | | 2 | 2 | 2 | 2 | 2 | 2 | 2 | 2 |
| Dicup 40KE: (Dicumyl Peroxide) | 1.5 | 1.5 | 1.5 | 1.5 | 1.5 | .75 | .75 | .75 | .75 | .75 | .75 | .75 | .75 |
| Injection Molding Conditions | | | | | | | | | | | | | |
| Machine Type | | Stokes | | | | | | | | | | | |
| Machine Size | | 7 oz | | | | | | | | | | | |
| Injection Time (sec) | | 1.5 | 2.5 | | | 1.5 | | | | | | | |
| Low Pressure Hold Time (sec) | | | | | | | | | | | | | |
| Front Zone Residence Time (min) | | .5 | .5 | | | | 2.5 | 2.5 | 2.5 | 2.5 | 2.5 | 2.5 | 2.5 |
| Screw Back Time (sec) | 31.5 | 50 | | | | 30 | | | | | | | |
| Mold Close Time (min) | | | | | | | | | | | | | |
| Screw Speed (rpm) | 50 | 50–75 | | | | | | | | | | | |
| Zone #3 Temp (°F.) | | 310 | | | | | | | | | | | |
| Zone #2 Temp (°F.) | | 310 | | | | | | | | | | | |
| Zone #1 Temp (°F.) | | 315 | | | | | | | | | | | |
| Nozzle Temp (°F.) | | 315 | | | | | | | | | | | |
| Melt Temp (°F.) | 397 | | 392 | 413 | | 387 | | | | | | | |
| Mold Temp (°F.) | | | | | | | 48 | | 355 | | | | |
| Part Wt. (gms) | blew apart | 132.1 | 130.1 | 131.3 | 130.6 | 135.7 | 135.5 | 134.9 | 134.5 | 134.2 | 134.1 | 134 | 133.8 |
| Part Cooled (Air, Water, Ice) | ice | ice | ice | air didnt fill mold | didnt fill mold | ice | ice | ice | air | air | air | ice | ice |

| Compound | 31i | 31j | 31k | 32a | 32b | 32c | 32d | 32e | 32f | 32g | 32h | 32i | 32j |
|---|---|---|---|---|---|---|---|---|---|---|---|---|---|
| Surlyn 8528 | 100 | 100 | 100 | 100 | 100 | 100 | 100 | 100 | 100 | 100 | 100 | 100 | 100 |
| Elvax 420 | | | | | | | | | | | | | |
| Nucrel 403 | | | | | | | | | | | | | |
| Elvaloy 944 | | | | | | | | | | | | | |
| Nucrel 925 | | | | | | | | | | | | | |
| Celogen AZ-130 | | | | | | | | | | | | | |
| Celogen OT | 2 | 2 | 2 | | | | | | | | | | |
| Hydrocerol BIH | | | | 2 | 2 | 2 | 2 | 2 | 2 | 2 | 2 | 2 | 2 |
| Atomite (CaCO3) | 4 | 4 | 4 | 4 | 4 | 4 | 4 | 4 | 4 | 4 | 4 | 4 | 4 |
| Kaddox 15 (ZnO) | 2 | 2 | 2 | 2 | 2 | 2 | 2 | 2 | 2 | 2 | 2 | 2 | 2 |
| Dicup 40KE: (Dicumyl Peroxide) | .75 | .75 | .75 | .5 | .5 | .5 | .5 | .5 | .5 | .5 | .5 | .5 | .5 |
| Injection Molding Conditions | | | | | | | | | | | | | |
| Machine Type | | | | | Stokes | | | | | | | | |
| Machine Size | | | | | 7 oz | | | | | | | | |

-continued

| | | | | | | | | | | | | |
|---|---|---|---|---|---|---|---|---|---|---|---|---|
| Injection Time (sec) | | | | 1.4 | 1.4 | | | | | | | |
| Low Pressure Hold Time (sec) | | | | | | | | | | | | |
| Front Zone Residence Time (min) | 2.5 | 2 | | 0 | 2.5 | | | | 2.5 | 3 | 3 | 3 |
| Cycle Time (min) | | | | | | | | | | | | |
| Screw Back Time (sec) | | | | 28 | | | | | | | | |
| Mold Close Time (min) | | | | | | | | | | | | |
| Screw Speed (rpm) | | | | | 50–75 | | | | | | | |
| Zone #3 Temp (°F.) | | | | | 310 | | | | | | | |
| Zone #2 Temp (°F.) | | | | | 310 | | | | | | | |
| Zone #1 Temp (°F.) | | | | | 315 | | | | | | | |
| Nozzle Temp (°F.) | | | | | 315 | | | | | | | |
| Melt Temp (°F.) | | 386 | | 388 | 315 | | | | | | | |
| Mold Temp (°F.) | | | | | | | | | | | | |
| Part Wt. (gms) | 133.4 | 134 | | 134.2 | 134.4 | 134.2 | 132.9 | 132.1 | 132.4 | 132.7 | 132.3 | 132.4 | 132.2 |
| Part Cooled (Air, Water, Ice) | ice | ice | ice | ice | ice | air | ice | air | ice | ice | ice | ice | ice |

| Compound | 32k | 32l | 32m | 33a | 33b | 33c | 33d | 33e | 33f | 33g | 33h | 33i | 33j |
|---|---|---|---|---|---|---|---|---|---|---|---|---|---|
| Surlyn 8528 | 100 | 100 | 100 | 100 | 100 | 100 | 100 | 100 | 100 | 100 | 100 | 100 | 100 |
| Elvax 420 | | | | | | | | | | | | | |
| Nucrel 403 | | | | | | | | | | | | | |
| Elvaloy 944 | | | | | | | | | | | | | |
| Nucrel 925 | | | | | | | | | | | | | |
| Celogen AZ-130 | | | | 1 | 1 | 1 | 1 | 1 | 1 | 1 | 1 | 1 | 1 |
| Celogen OT | | | | | | | | | | | | | |
| Hydrocerol BIH | 2 | 2 | 2 | | | | | | | | | | |
| Atomite (CaCO3) | 4 | 4 | 4 | 4 | 4 | 4 | 4 | 4 | 4 | 4 | 4 | 4 | 4 |
| Kaddox 15 (ZnO) | 2 | 2 | 2 | 2 | 2 | 2 | 2 | 2 | 2 | 2 | 2 | 2 | 2 |
| Dicup 40KE: (Dicumyl Peroxide) | .5 | .5 | .5 | .5 | .5 | .5 | .5 | .5 | .5 | .5 | .5 | .5 | .5 |
| Injection Molding Conditions | | | | | | | | | | | | | |
| Machine Type | | | | | | | | Stokes | | | | | |
| Machine Size | | | | | | | | 7 oz | | | | | |
| Injection Time (sec) | | | | 1.5 | | | 7 | 7.3 | | 3.6 | 4.7 | 5 | 5.5 |
| Low Pressure Hold Time (sec) | | | | | | | | | | | | | |
| Front Zone Residence Time (min) | 3 | 3 | | 0 | .25 | 1.5 | 1 | 0 | 2 | 2 | 2 | 2 | 0 |
| Cycle Time (min) | | | | | | | | | | | | | |
| Screw Back Time (sec) | | | | 36 | | | | | | | | | |
| Mold Close Time (min) | | | | | | | | | | | | | |
| Screw Speed (rpm) | | | | | | | | 50–75 | | | | | |
| Zone #3 Temp (°F.) | | | | | | | | 310 | | | | | |
| Zone #2 Temp (°F.) | | | | | | | | 310 | | | | | |
| Zone #1 Temp (°F.) | | | | | | | | 315 | | | | | |
| Nozzle Temp (°F.) | | | | | | | | 315 | | | | | |
| Melt Temp (°F.) | | 382 | 406 | | | | | 391 | | | | | |
| Mold Temp (°F.) | | | | | | | | 48 | | | | | |
| Part Wt. (gms) | 131.9 | 131.7 | 119.6 | 132.6 | 130.5 | 139.6 | 130.7 | 129.8 | 132 | 131.8 | 131.5 | 129.6 | 129.3 |
| Part Cooled (Air, Water, Ice) | air | ice | | blew apart | blew apart | blew apart | blew apart | ice | blew apart | blew apart | blew apart | | |

| Compound | 33k | 33l | 34a | 34b | 34c | 34d | 34e | 34f | 34g | 34h | 34i | 34j |
|---|---|---|---|---|---|---|---|---|---|---|---|---|
| Surlyn 8528 | 100 | 100 | 100 | 100 | 100 | 100 | 100 | 100 | 100 | 100 | 100 | 100 |
| Elvax 420 | | | | | | | | | | | | |
| Nucrel 403 | | | | | | | | | | | | |
| Elvaloy 944 | | | | | | | | | | | | |
| Nucrel 925 | | | | | | | | | | | | |
| Celogen AZ-130 | 1 | 1 | | | | | | | | | | |
| Celogen OT | | | 2 | 2 | 2 | 2 | 2 | 2 | 2 | 2 | 2 | 2 |
| Hydrocerol BIH | | | | | | | | | | | | |
| Atomite (CaCO3) | 4 | 4 | 4 | 4 | 4 | 4 | 4 | 4 | 4 | 4 | 4 | 4 |
| Kaddox 15 (ZnO) | 2 | 2 | 2 | 2 | 2 | 2 | 2 | 2 | 2 | 2 | 2 | 2 |
| Dicup 40KE: (Dicumyl Peroxide) | .5 | .5 | .5 | .5 | .5 | .5 | .5 | .5 | .5 | .5 | .5 | .5 |
| Injection Molding Conditions | | | | | | | | | | | | |
| Machine Type | | | | | | | | | | | | Stokes |
| Machine Size | | | | | | | | | | | | 7 oz |
| Injection Time (sec) | | | 1.5 | | | | | | | | | |
| Low Pressure Hold Time (sec) | | | | | | | | | | | | |
| Front Zone Residence Time (min) | 0 | 0 | 0 | 2 | 2 | 2 | 2 | 2.5 | 2.5 | 3 | 3 | 3.5 |
| Screw Back Time | | | 38 | | | | | | | | | |

-continued

| | | | | | | | | | | | | |
|---|---|---|---|---|---|---|---|---|---|---|---|---|
| (sec) Mold Close Time | | | | | | | | | | | | |
| (min) Screw Speed (rpm) | | | | | | | | | | | | 50-75 |
| Zone #3 Temp (°F.) | | | | | | | | | | | | 310 |
| Zone #2 Temp (°F.) | | | | | | | | | | | | 310 |
| Zone #1 Temp (°F.) | | | | | | | | | | | | 315 |
| Nozzle Temp (°F.) | | | | | | | | | | | | 315 |
| Melt Temp (°F.) | | 383 | | | | | | | | | | 384 |
| Mold Temp (°F.) | | | | | | | | | | | 48 | |
| Part Wt. (gms) | 130.3 | 128.6 | 132 | 135 | 134.8 | 134.7 | 134.5 | 134.7 | 134.4 | 134.4 | 134.5 | 134.4 |
| Part Cooled (Air, Water, Ice) | | | ice | ice | ice | ice | air | ice | ice | ice | ice | ice |

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described our invention, we claim:

1. A softball or baseball comprising a core and a cover, wherein the core is comprised of about 100 parts by weight of a thermoplastic olefin resin having polymer radicals; from about 0.25 to about 5 parts by weight of a blowing agent; from about 0.5 to about 15 parts by weight of a nucleating agent; and from about 0.25 to about 1.5 parts by weight of a peroxide crosslinking agent which forms irreversible covalent bonds between the polymer radicals such that the core is a blown cell structure having a substantially uniform cellular cross-section and a substantially consistent average cell size, the peroxide crosslinking agent further providing heat resistance in the core.

2. The softball or baseball of claim 1, wherein the peroxide is dicumyl peroxide.

3. The softball or baseball of claim 1, wherein said thermoplastic olefin resin having polymer radicals is a polymeric material selected from the group consisting of polyolefin resins and ionic copolymers of an olefin having from 2 to 8 carbon atoms and a metal salt of an unsaturated monocarboxylic acid having from 3 to 8 carbon atoms.

4. The softball or baseball of claim 1, wherein said thermoplastic olefin resin having polymer radicals is a copolymer of ethylene and acrylic acid or methacrylic acid.

5. The softball or baseball of claim 1, wherein said thermoplastic olefin resin is a copolymer of ethylene and vinyl acetic.

6. The softball or baseball of claim 1, wherein said thermoplastic olefin resin is a polymeric material selected from the group consisting of ionic copolymers of olefins having from 2 to 8 carbon atoms and the sodium salt of an unsaturated monocarboxylic acid having from 3 to 8 carbon atoms, and ionic copolymers of olefins having from 2 to 8 carbon atoms and a metal salt of an unsaturated monocarboxylic acid having from 3 to 8 carbon atoms.

7. The softball or baseball of claim 1, wherein the core has an average cell size of about 0.15 inches in diameter.

8. The softball or baseball of claim 1, wherein the heat resistance of the core which results from the peroxide crosslinking agent provides for a more durable core during cover molding.

9. The softball or baseball of claim 1, wherein the cover can be molded to the core by means of a plastisol fusion process without collapsing the core.

10. The softball or baseball of claim 1, wherein the cover is a molded vinyl cover.

11. The softball or baseball of claim 10, wherein the vinyl cover is molded over the core at elevated temperatures between about 320° and 350° F.

12. The softball or baseball of claim 1, wherein the core composition further comprises a modifying ingredient selected from the group consisting of fillers, fatty acids, metal oxides, and mixtures thereof.

13. The softball or baseball of claim 1, wherein the core composition further comprises trimethylolpropane triacylate.

14. A softball or baseball comprising a cellular core and a vinyl cover, wherein the cellular core has a diameter of about 3.70 to 3.75 inches, a weight of about 130 to 136 grams, a compression of about 8 to 13 inches, a coefficient of restitution of about 0.400 to 0.600 and an ability to withstand over 150 blows measured according to a durability pound test wherein the cellular core is formed from a thermoplastic olefin resin, a blowing agent, a nucleating agent and a peroxide crosslinking agent.

15. The softball or baseball of claim 14, wherein the cellular core is formed from about 100 parts by eight of thermoplastic olefin resin selected from the group consisting of polyolefin resins and ionic copolymers of olefins having from 2 to 8 carbon atoms and a metal salt of an unsaturated monocarboxylic acid having from 3 to 8 carbon atoms; from about 0.25 to about 5 parts by weight of a blowing agent; from about 0.5 to about 15 parts by weight of a nucleating agent; and from about 0.25 to about 1.5 parts by weight of a peroxide crosslinking agent.

16. A method for constructing a softball or baseball having a core and cover, the method comprising the step of:

a) molding by foam injection a thermoplastic olefin resin comprising a mixture of 100 parts by weight of a copolymer of an olefin having from 2 to 8 carbon atoms and an unsaturated monocarboxylic acid having from 3 to 8 carbon atoms; from about 0.25 to about 5 parts by weight of a blowing agent; from about 0.5 to about 15 parts by weight of a nucleating agent; and from 0.25 to about 1.5 of a peroxide crosslinking agent to form a spherical cellular core having heat resistance; and, b) applying a cover to the core by means of a plastisol fusion process at temperatures between 320° and 350° F.

17. A softball or baseball produced by the method of:

a) molding by foam injection a thermoplastic resin comprising a mixture of 100 parts by weight of a copolymer of an olefin having from 2 to 8 carbon atoms and an unsaturated monocarboxylic acid having from 3 to 8 carbon atoms; from about 0.25 to about 5 parts by weight of a blowing agent; from about 0.5 to about 15 parts by weight of a nucleating agent; and from 0.25 to about 1.5 parts by weight of a peroxide crosslinking agent to form a spherical cellular core having heat resistance; and, b) applying a cover to the core by means of a plastisol fusion process at temperatures between 320° and 350° F.

18. The method of claim 16, wherein the foam injection molding of the thermoplastic olefin resin forms a core having a microcellular structure in which the cells are substantially uniform in shape and about 0.15 inches or less in diameter.

19. A softball or baseball produced by the method of:

a) molding by foam injection a thermoplastic resin comprising a mixture of 100 parts by weight of a copolymer of an olefin having from 2 to 8 carbon atoms and an unsaturated monocarboxylic acid having from 3 to 8 carbon atoms; from about 0.25 to about 5 parts by weight of a nucleating agent; and from 0.25 to about 1.5 parts by weight of a peroxide crosslinking agent to form a spherical cellular core having heat resistance, wherein the foam injection molding of the thermoplastic resin forms a core having a microcellular structure in which the cells are substantially uniform in shape and about 0.15 inches or less in diameter; and, b) applying a cover to the core by means of a plastisol fusion process at temperatures between 320° and 350° F.

20. In a core composition for a softball comprising a base thermoplastic resin, a blowing agent, a nucleating agent and a crosslinking agent, the improvement comprises using a peroxide as the crosslinking agent to produce a cellular core having a substantially uniform cellular cross section and an average cell size of about 0.015 inches in diameter.

21. In a softball or baseball comprised of a thermoplastic olefin resin, the improvement comprises the addition of a peroxide to the thermoplastic olefin resin thereby promoting crosslinking of the thermoplastic olefin resin during processing thereof, wherein the resulting game ball has a stable blown-cell structure in the core.

22. A molded softball core, comprising:

about 100 parts by weight of a thermoplastic olefin resin having polymer radicals, the thermoplastic olefin resin having polymer radicals being a polymeric material selected from the group consisting of polyolefin resins and ionic copolymers of an olefin having 2 to 8 carbon atoms and a metal salt of an unsaturated monocarboxylic acid having from 3 to 8 carbon atoms;

from about 0.25 to about 5 parts by weight of a blowing agent;

from about 0.5 to about 15 parts by weight of a nucleating agent; and from about 0.25 to about 1.5 parts by weight of dicumyl peroxide crosslinking agent which forms irreversible covalent bonds between the polymer radicals such that the core is a blown-cell structure having a substantially uniform cellular cross section and a substantially consistent average cell size of less than or equal to about 0.015 inches in diameter, the peroxide crosslinking agent further providing an increase in the heat resistance of the core, the core having a diameter of about 3.70 to 3.75 inches, a weight of about 130 to 136 grams, a compression of about 8 to 13 inches, a coefficient of restitution of about 0.400 to 0.600 and an ability to withstand over 150 blows measured according to a durability pound test.

23. The softball or baseball of claim 17 wherein the peroxide crosslinking agent is dicumyl peroxide.

24. The softball or baseball of claim 19 wherein the peroxide crosslinking agent is dicumyl peroxide.

25. The softball or baseball of claim 21 wherein the peroxide is dicumyl peroxide.

* * * * *